United States Patent
Kulangara et al.

(10) Patent No.: US 11,040,995 B2
(45) Date of Patent: Jun. 22, 2021

(54) CATALYST COMPRISING A METALLOCENE COMPLEX AND CO-CATALYST

(71) Applicant: SABIC GLOBAL TECHNOLOGIES B.V., Bergen op Zoom (NL)

(72) Inventors: Shaneesh Vadake Kulangara, Geleen (NL); Nicolaas Hendrika Friederichs, Geleen (NL); Anton Ginzburg, Geleen (NL); Alexander Voskoboynikov, Geleen (NL); Vyatcheslav Izmer, Geleen (NL); Dmitry Kononovich, Geleen (NL); Oleg Samsonov, Geleen (NL); Antonio Vittoria, Geleen (NL); Vincenzo Busico, Geleen (NL); Roberta Cipullo, Geleen (NL); Ninad Ghavale, Geleen (NL); Nitin Nandurkar, Geleen (NL); Ilya Borisov, Geleen (NL); Bogdan Guzeev, Geleen (NL); Dmitry Uborsky, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 356 days.

(21) Appl. No.: 16/067,863

(22) PCT Filed: Jan. 2, 2017

(86) PCT No.: PCT/EP2017/050011
§ 371 (c)(1),
(2) Date: Jul. 3, 2018

(87) PCT Pub. No.: WO2017/118617
PCT Pub. Date: Jul. 13, 2017

(65) Prior Publication Data
US 2020/0270292 A1    Aug. 27, 2020

(30) Foreign Application Priority Data

Jan. 5, 2016 (EP) .................... 16150209
Oct. 12, 2016 (EP) .................... 16193512

(51) Int. Cl.
*C07F 17/00* (2006.01)
*C08F 210/16* (2006.01)
*C08F 4/6592* (2006.01)

(52) U.S. Cl.
CPC .......... *C07F 17/00* (2013.01); *C08F 4/65927* (2013.01); *C08F 210/16* (2013.01)

(58) Field of Classification Search
CPC ..... C07F 17/00; C08F 4/65927; C08F 210/16
See application file for complete search history.

(56) References Cited

U.S. PATENT DOCUMENTS

| 5,132,262 A | 7/1992 | Rieger et al. |
| 6,096,912 A | 8/2000 | Karl et al. |

(Continued)

FOREIGN PATENT DOCUMENTS

| WO | 2012134720 A2 | 10/2012 |
| WO | 2014139949 A1 | 9/2014 |
| WO | 2015132346 A1 | 9/2015 |

OTHER PUBLICATIONS

SciFinder Search (Sep. 25, 2020).*

(Continued)

*Primary Examiner* — Vu A Nguyen
(74) *Attorney, Agent, or Firm* — Cantor Colburn LLP

(57) ABSTRACT

The invention relates to a metallocene complex according to formula I or II wherein M is a metal selected from lanthanides or transition metals from group 3, 4, 5 or 6 of the Periodic System of the Elements, Q is an anionic ligand to M, k is the number of Q groups and equals the valence of M minus 2, R is a divalent bridging group, $R^1$, $R^2$, $R^3$ and R4 are each independently chosen from the group consisting of hydrogen (H); a halogen atom; a silyl, alkyl, cycloalkyl, aryl, alkylaryl or arylalkyl group; and $R^5$, $R^6$, $R^7$ and $R^8$ are each independently chosen from the group consisting of hydrogen (H); a halogen atom; a silyl, alkyl, cycloalkyl, aryl, alkylaryl or arylalkyl group; or two adjacent radicals $R^5$ and $R^6$, $R^6$ and $R^7$, and $R^7$ and $R^8$ are connected with each other in a hydrocarbon ring system. The invention also relates to a catalyst comprising the metallocene complex, to a process for making polyolefins and to the use of the polyolefins for making articles.

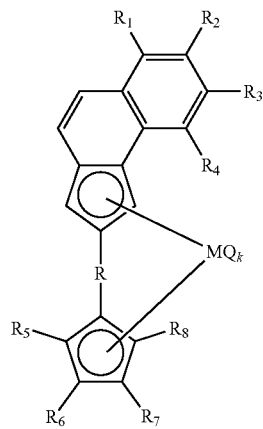

Formula I (Continued)

-continued

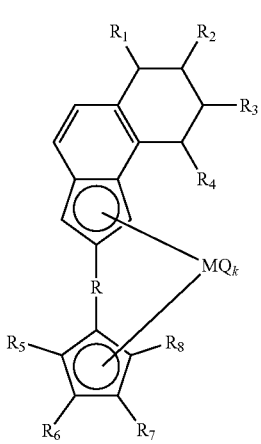

Formula II

15 Claims, No Drawings

(56) References Cited

U.S. PATENT DOCUMENTS 6,342,622 B1 * 1/2002 Arts .................. C07F 17/00
  556/53
6,541,584 B1  4/2003 Resconi

OTHER PUBLICATIONS

Doerpinghaus et al., "Separating the effects of sparse long-chain branching on rheology from those due to molecular weight in polyethylenes" J. Rheol. 47(3), 2003, 20 pages.
International Search Report for International Application No. PCT/EP2017/050011, International Filing Date Jan. 2, 2017, dated Feb. 6, 2017, 3 pages.
Peacock, Andrew J., "Handbook of Polyethylene", Chapter 3 Production Processes, 2000, Marcel Dekker, Inc., New York; ISBN 0824795466; p. 43-66.
Randall, "A Review of High Resolution Liquid 13Carbon Nuclear Magnetic Resonance Characterizations of Ethylene-Based Polymers" Rev. Macromol. Chem. Phys., C.29, V. 2 & 3, 1989, 16 pages.
Rudin, A., "Practical Aspects of Molecular Weight Measurements" Modern Methods of Polymer Characterization, John Wiley & Sons, New York (1991) pp. 103-112.
Written Opinion for International Application No. PCT/EP2017/050011, International Filing Date Jan. 2, 2017, dated Feb. 6, 2017, 6 pages.
Zimm, G.H. And Stockmayer, W.H., J. "The Dimensions of Chain Molecules Containing Branches and Rings" Chem. Phys., 17, 1301 (1949).

* cited by examiner

CATALYST COMPRISING A METALLOCENE COMPLEX AND CO-CATALYST

CROSS REFERENCE TO RELATED APPLICATIONS

This application is a National Stage application of PCT/EP2017/050011, filed Jan. 2, 2017, which claims the benefit of European Application No. 16150209.1, filed Jan. 5, 2016, and European Application No. 16193512.7, filed Oct. 12, 2016, all of which are incorporated by reference in their entirety herein.

The invention relates to a metallocene complex, to a catalyst comprising the metallocene complex, a co-catalyst and optionally an inorganic support material, a process for the preparation of the catalyst, a process for the preparation of olefin polymers by polymerizing one or more olefins in the presence of the catalyst and the use of the olefin polymers.

The catalyst that is used in a process for the preparation of olefin polymers comprises a bridged metallocene complex. Bridged metallocene complexes are known according to the state of the art and are for instance described in U.S. Pat. Nos. 6,342,622, 6,541,548, 5,132,262 and U.S. Pat. No. 6,096,912.

U.S. Pat. No. 6,342,622 describes bridged indenyl metallocene complexes comprising at least one indenyl group and a bridge comprising at least one sp2-hybridized carbon atom that is bonded to the indenyl group at the 2-position.

U.S. Pat. No. 6,541,584 describes bridged bis(tetrahydroindenyl) metallocene complexes wherein a divalent group bridges the two tetrahydroindenyl groups.

U.S. Pat. No. 5,132,262 describes bridged metallocene complexes wherein the bridge comprises silicon or germanium. The metallocene complexes are used for the preparation of propylene homo- and copolymers.

U.S. Pat. No. 6,096,912 describes bridged metallocene complexes wherein the bridge comprises carbon, sulfur, phosphorus, silicon or germanium. The metallocene complexes are used for the preparation of propylene homo- and copolymers.

WO2014139949 describes bridged 2-indenyl metallocene complexes wherein the bridge comprises a sp2 hybridized carbon atom.

A disadvantage of known catalysts comprising bridged metallocene complexes is that these catalysts produce low molecular weight copolymers when the catalysts are used for a copolymerization of ethylene with an α-olefin. There is a need for catalysts that can produce high molecular weight copolymers of ethylene and α-olefins. Also there is a need for catalysts that have a high affinity for α-olefins, like for example propylene, butene, hexene and octene, to make low density polyethylenes, or to incorporate α-olefins with high efficiency into polyolefins.

The invention relates to a metallocene complex according to formula I or II

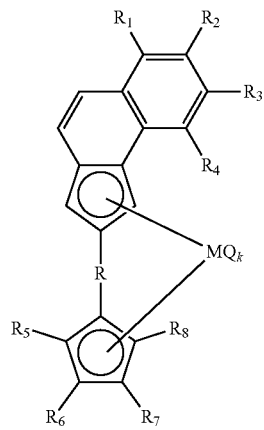

Formula I

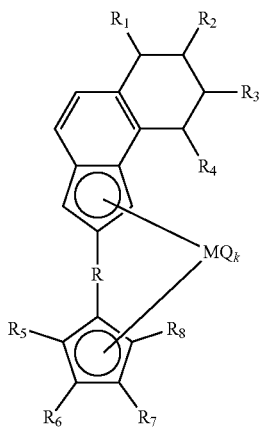

Formula II wherein
  M is a metal selected from lanthanides or transition metals from group 3, 4, 5 or 6 of the Periodic System of the Elements,
  Q is an anionic ligand to M,
  k is the number of Q groups and equals the valence of M minus 2,
  R is a divalent bridging group,
  $R_1$, $R_2$, $R_3$ and $R_4$ are each independently chosen from the group consisting of hydrogen (H); a halogen atom; a silyl, alkyl, cycloalkyl, aryl, alkylaryl or arylalkyl group; and
  $R_5$, $R_6$, $R_7$ and $R_8$ are each independently chosen from the group consisting of hydrogen (H); a halogen atom; a silyl, alkyl, cycloalkyl, aryl, alkylaryl or arylalkyl group; or two adjacent substituents $R_5$ and $R_6$, $R_6$ and $R_7$, and/or $R_7$ and $R_8$ are connected with each other in a hydrocarbon ring system.

The invention further relates to a catalyst comprising
  a. the metallocene complex described above
  b. a co-catalyst and
  c. optionally an inorganic support material.

It has been surprisingly discovered that by using a catalyst according to the invention for the preparation of olefin polymers, olefin polymers are obtained with a high molecular weight. A further advantage is that the catalyst according to the invention can prepare copolymers of ethylene with α-olefins having 3 or more carbon atoms wherein the copolymers have a high α-olefin content.

The catalyst according to the invention comprises a metallocene complex, a co-catalyst and optionally an inorganic support material.

The metallocene complex used to prepare the catalyst is a metallocene complex according to formula I or II

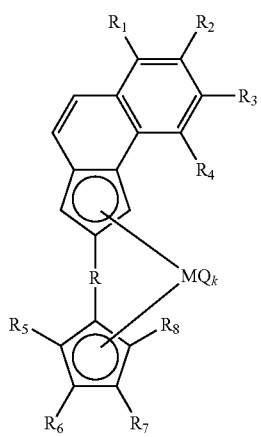

Formula I

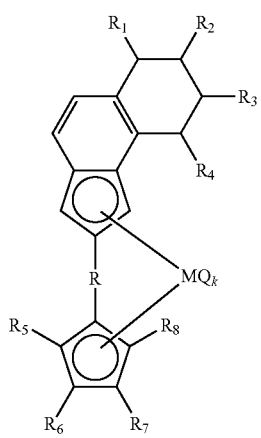

Formula II wherein
M is a metal selected from lanthanides or transition metals from group 3, 4, 5 or 6 of the Periodic System of the Elements,
Q is an anionic ligand to M,
k is the number of Q groups and equals the valence of M minus 2,
R is a divalent bridging group,
$R_1$, $R_2$, $R_3$ and $R_4$ are each independently chosen from the group consisting of hydrogen (H); a halogen atom; a silyl, alkyl, cycloalkyl, aryl, alkylaryl or arylalkyl group; and
$R_5$, $R_6$, $R_7$ and $R_8$ are each independently chosen from the group consisting of hydrogen (H); a halogen atom; a silyl, alkyl, cycloalkyl, aryl, alkylaryl or arylalkyl group; or two adjacent radicals $R_5$ and $R_6$, $R_6$ and $R_7$, and/or $R_7$ and $R_8$ are connected with each other in a hydrocarbon ring system.

The metallocene complex comprises a metal selected from lanthanides or transition metals from group 3, 4, 5 or 6 of the Periodic System of the Elements. The Periodic System of the Elements is understood to be the Periodic System of the Elements that can be found at www.chemicool.com. The metal M is preferably chosen from the group consisting of Ti, Zr, Hf, V and Sm, more preferably from Ti, Zr and Hf, most preferably the metal is Zr.

Q is an anionic ligand to M. The Q ligands preferably are the same and are selected from the group consisting of halogen (F, Cl, Br, I) and alkyl groups comprising 1 to 20 carbon atoms. More preferably the Q ligands are Cl or a methyl group.

k is the number of Q groups and equals the valence of M minus 2; k is an integer. Preferably, k is 2.

The metallocene complex of the present invention comprises two ligands which each contain cyclopentadienyl fragment which are bound to the metal. The two ligands are bridged at the cyclopentadienyl fragment through R.

The ligand in the metallocene complex according to the invention contains at least a moiety that is an optionally substituted cyclopenta[a]naphthalene moiety or tetrahydro-cyclopenta[a]naphthalene moiety. The structure of the ligands is given here below.

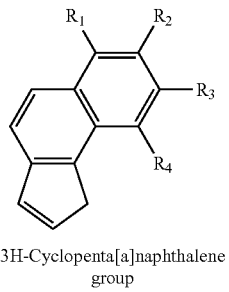

3H-Cyclopenta[a]naphthalene group

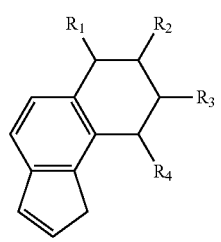

Tetrahydro-3H-cyclopenta[a] naphthalene group

The groups can be turned into anionic $q^5$-ligands, which can be connected to the metal M.

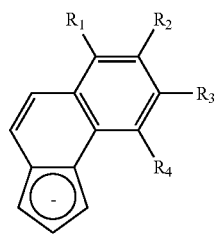

Anionic Cyclopenta[a]naphthalene Ligand

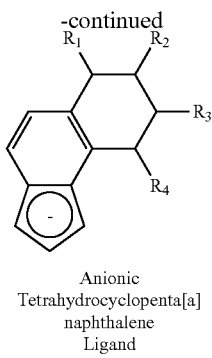

Anionic
Tetrahydrocyclopenta[a]
naphthalene
Ligand

In an embodiment both ligands are each independently (optionally substituted) cyclopenta[a]naphthalene ligands or tetrahydrocyclopenta[a]naphthalene ligands.

R is a divalent bridging group. R can comprise sp3 and/or sp2 hybridized atoms.

According to one embodiment of the invention R comprises at least one sp2 hybridized carbon atom. The at least one sp2 hybridized carbon atom in the bridging group R is preferably connected to at least one carbon atom in the cyclopentadienyl ring of one of the ligands in the metallocene complex.

Examples of bridging groups R are vinylene, vinylidene, propenylene, hexenylene, phenylene, cyclopropenylene, cyclobutenylene, cyclopentenylene, cyclohexenylene, cyclohexadienylene, tolylene, benzylene, naphthylene, anthrylene, pyrenylene, biphenylene and binaphthylene. The bridging group R can be substituted with alkyl groups having 1 to 10 carbon atoms, for example the substituents may be selected from the group of methyl, ethyl, n-propyl, n-butyl, n-pentyl or n-hexyl. Preferably, R carries less than 10 substituents, more preferably less than 5 substituents and most preferably no substituents. R preferably is chosen from the group consisting of a biphenylene group or a substituted biphenylene group. Most preferably, R is chosen from the group consisting of a 2,2'-biphenylene group or a substituted 2.2'-biphenylene group.

According to another embodiment of the invention R comprises at least one sp3 hybridized atom. In this embodiment R preferably has the structure Y(Z)n, wherein Y is the bridging atom and is selected from carbon, nitrogen, phosphorus, sulfur, silicon or germanium, Z is C1-08 alkyl, C3-C10 cycloalkyl or C6-C10 aryl and n is 0, 1 or 2. More preferably, Y is carbon, silicon or germanium, Z is C1-C8 alkyl and n is 2. For example R is a —SiMe$_2$ group, or a —SiEt$_2$ group.

The bridging group R can be connected to the 1-position or the 2-position of the cyclopentadienyl ring in the ligands. The bridging group R is preferably connected to the 2-position of the cyclopenta[a]naphthalene ligand or the tetrahydrocyclopenta[a]naphthalene ligand. When the metallocene complex comprises two cyclopenta[a]naphthalene ligands or two tetrahydrocyclopenta[a]naphthalene ligands the bridging group R is preferably connected to the 2-position of both ligands.

$R_1$, $R_2$, $R_3$ and $R_4$ are each independently chosen from the group consisting of hydrogen (H); a halogen atom; a silyl, alkyl, cycloalkyl, aryl, alkylaryl or arylalkyl group. For example $R_1$, $R_2$, $R_3$ and $R_4$ can be H, a halogen atom, or an alkyl group having from 1-20 C-atoms, or an aryl group having from 6-20 C-atoms.

Examples of halogen groups are F, Cl, Br and I.

Examples of alkyl groups are methyl, ethyl, propyl, butyl, hexyl and decyl. Examples of cycloalkyl groups are cyclopropane, cyclopentane and cyclohexane. Examples of aryl groups are phenyl, indenyl, naphtyl and fluorenyl. Examples of alkylaryl groups are benzyl, pentamethylbenzyl and trityl. Examples of arylalkyl substituents are xylyl, mesityl, tolyl and cumyl. Preferably the substituents $R_1$, $R_2$, $R_3$ and $R_4$ are independently chosen from the group consisting of H, F, Cl, methyl, ethyl and phenyl.

In an embodiment the substituents $R_1$, $R_2$, $R_3$ and $R_4$ are H.

$R_5$, $R_6$, $R_7$ and $R_8$ are each independently chosen from the group consisting of hydrogen (H); a halogen atom; a silyl, alkyl, cycloalkyl, aryl, alkylaryl or arylalkyl group;

For example $R_5$, $R_6$, $R_7$ and $R_8$ can independently be H, a halogen atom, or an alkyl group having from 1-20 C-atoms, or an aryl group having from 6-20 C-atoms.

Examples of halogen groups are F, Cl, Br and I. Examples of alkyl groups are methyl, ethyl, propyl, butyl, hexyl and decyl. Examples of cycloalkyl groups are cyclopropane, cyclopentane and cyclohexane. Examples of aryl groups are phenyl, indenyl, naphtyl and fluorenyl. Examples of alkylaryl groups are benzyl, pentamethylbenzyl and trityl. Examples of arylalkyl substituents are xylyl, mesityl, tolyl and cumyl. Preferably the substituents $R_5$, $R_6$, $R_7$ and $R_8$ are independently chosen from the group consisting of H, F, Cl, methyl, ethyl and phenyl.

In an embodiment of the invention, two adjacent substituents $R_5$ and $R_6$, $R_6$ and $R_7$, and/or $R_7$ and $R_8$ may be connected with each other in a hydrocarbon ring system. In this way, for example, an indenyl group or tetrahydroindenyl group, a cyclopenta[a]naphthalene group, cyclopenta[b]naphthalene group, tetrahydrocyclopenta[a]naphthalene group or tetrahydrocyclopenta[b]naphthalene group can be formed by connection of $R_5$ and $R_6$, or $R_6$ and $R_7$, or $R_7$ and $R_8$; a fluorenyl ligand can be formed by connection of both $R_5$ and $R_6$ and $R_7$ and $R_8$. Preferably, $R_6$ and $R_7$ are connected and form together a ring system, such that a (optionally substituted) cyclopenta[a]naphthalene group or tetrahydrocyclopenta[a]naphthalene group is formed.

Examples of preferred metallocene complexes according to the invention, wherein R comprises at least one sp2 hybridized carbon atom, are complexes according to formulas III-X:

III

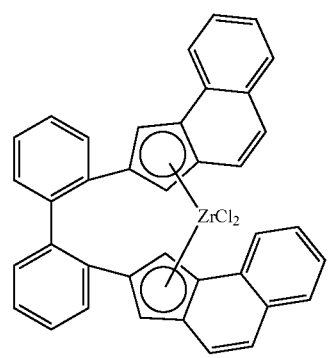

IV
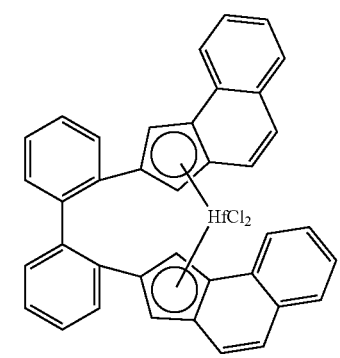
V
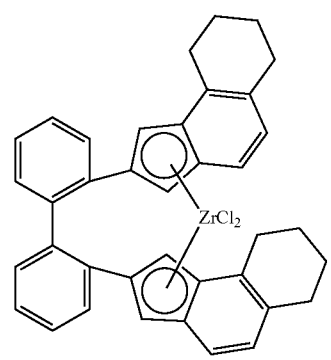
VI
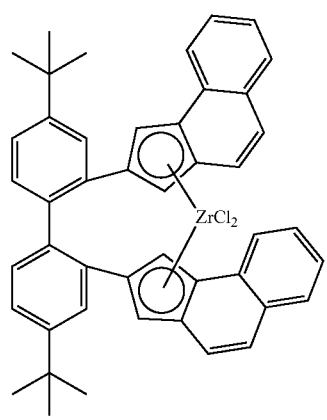
VII
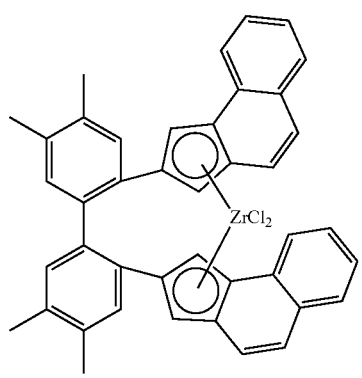
VIII
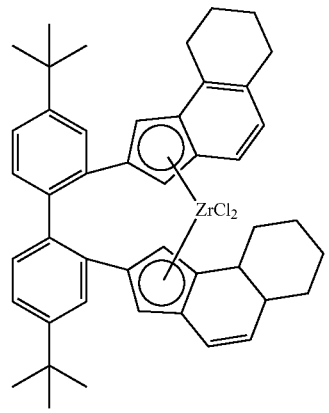
IX
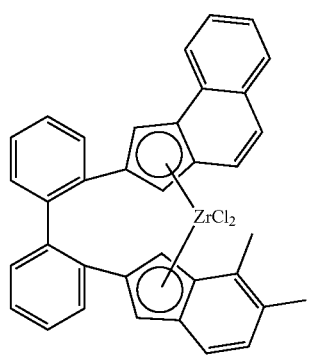
X
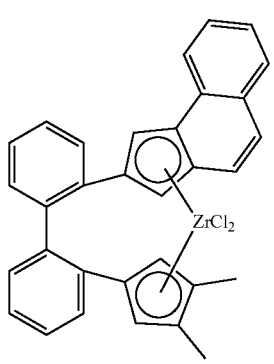
Examples of preferred metallocene complexes according to the invention, wherein R comprises at least one sp3 hybridized atom, are complexes according to formulas XI-XIII:

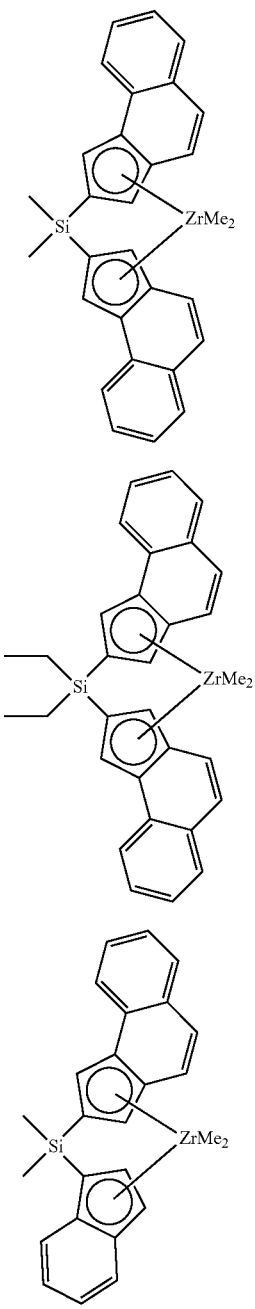

XI

XII

XIII

The catalyst according to the invention comprises anyone of the metallocene complexes described above and a co-catalyst. The co-catalyst employed according to the present invention can be an aluminium- or boron-containing co-catalysts. Suitable aluminium-containing co-catalysts comprise aluminoxanes and alkyl aluminium. The aluminoxanes usable according to the present invention are well known and preferably comprise oligomeric linear and/or cyclic alkyl aluminoxanes represented by the formula: $R^6$—$(AlR^6$—$O)_n$—$AlR^6{}_2$ for oligomeric, linear aluminoxanes and $(-AlR^6$—$O-)_m$ for oligomeric, cyclic aluminoxanes; wherein n is 1-40, preferably n is 10-20; m is 3-40, preferably m is 3-20 and $R^6$ is a $C_1$ to $C_8$ alkyl group and preferably a methyl group. Further other organoaluminum compounds can be used such as trimethylaluminum, triethylaluminium, triisopropylaluminum, tri-n-propylaluminum, triisobutylaluminum, tri-n-butylaluminum, triamylaluminium; dimethylaluminium ethoxide, diethylaluminium ethoxide, diisopropylaluminium ethoxide, di-n-propylaluminium ethoxide, diisobutylaluminum ethoxide and di-n-butylaluminium ethoxide; dimethylaluminium hydride, diethylaluminium hydride, diisopropylaluminium hydride, di-n-propylaluminium hydride, diisobutylaluminum hydride, di-n-butylaluminium hydride and tetra-isobutylaluminoxane. Suitable boron-containing co-catalysts include perfluorophenylboranes and/or perfluorophenylborates as described for instance by Chen, E., Marks, T., in *Chemical Reviews* 2000, 100, 1391-1434.

In the process for the preparation of olefin polymers by polymerizing one or more olefins in the presence of a catalyst, preferably an organoaluminum co-catalyst is present.

More preferably, methylaluminoxane (MAO) is used as the co-catalyst.

In one embodiment a catalyst is formed from the metallocene complex as described above and the co-catalyst. This catalyst may be used, for example, in a solution polymerization of olefins.

In a preferred embodiment, the catalyst comprises an inorganic support material. When a support material is present, the support material is preferably an inert support material, more preferably a porous inert support material. Examples of porous inert support materials are talc and inorganic oxides. Preferably, the support material is in a finely divided form.

Suitable inorganic oxide materials include group 2A, 3A, 4A and 4B metal oxides such as silica, alumina and mixtures thereof. Other inorganic oxides that may be employed either alone or in combination with the silica or alumina are magnesia, titania, zirconia and the like. Preferably, the catalyst comprises a support material and the support material is alumina or silica, more preferably a silica, most preferably a silica having a surface area between 200 and 900 m²/g and a pore volume between 0.5 and 4 ml/g.

The invention is also directed to a process for the preparation of the catalyst.

In one embodiment this process comprises the steps of
a. providing a solution of a cocatalyst, an inorganic support material and a metallocene complex
b. reacting the solution of the co-catalyst in a solvent with the metallocene complex to form a pre-catalyst solution,
c. adding the pre-catalyst solution to the inorganic support material to form a pre-catalyst mixture and
d. stirring the pre-catalyst mixture at elevated temperature under vacuum to form the catalyst.

In a second embodiment, the process to prepare the catalyst comprises the steps of
a. providing a cocatalyst, an inorganic support material and a metallocene complex
b. adding a solution of the cocatalyst in a solvent to the inorganic support to give a treated support
c. adding the metallocene complex to the treated support to give a pre catalyst mixture
d. stirring the pre catalyst mixture at elevated temperature under vacuum to form the catalyst.

The preferred Al/Zr molar ratio to be employed in the process for preparing the catalyst complex is between 10 and 1000, more preferably between 50 and 500, most preferably between 75 and 300.

Elevated temperature means a temperature between 20 and 150° C., preferably between 40 and 100° C.

The invention is also directed to a process for the preparation of olefin polymers by polymerizing one or more olefins in the presence of the catalyst according to the invention. In the process to produce olefin polymers the olefin which is polymerized can be one type of olefin or can be mixtures of different olefins. The polymerization thus includes homopolymerization and copolymerization. Examples of olefins are ethylene and α-olefins such as propylene, 1-butene, 1-pentene, 4-methyl-1-pentene, 1-hexene, 1-octene, 1-nonene, 1-decene and styrene; conjugated and non-conjugated dienes such as butadiene, 1,4-hexadiene, 5-ethylidene-2-norbornene, dicyclopentadiene, 4-methyl-1,4-hexadiene and 7-methyl-1,6-octadiene; and cyclic olefins such as cyclobutene, but is not limited thereto. The α-olefins may optionally contain heteroatoms, like for example O, N, S and P.

Preferably, at least one of the olefins that is polymerized is ethylene. More preferably, a mixture of ethylene and at least one α-olefin having 3 or more carbon atoms is polymerized.

Different types of polyethylene can be prepared with the process according to the invention. For example HDPE, MDPE, LLDPE, UHMWPE which can have a narrow molecular weight distribution or which may also show bimodal molecular weight distributions.

In particular, in the production of LLDPE obtained by copolymerizing ethylene and at least one α-olefin having 3 or more carbon atoms a high molecular weight of the olefin polymer can be obtained. Preferably, the α-olefin is chosen from 1-butene, 1-hexene or 1-octene, more preferably the α-olefin is 1-hexene.

For example an LLDPE having a melt mass flow rate (also known as melt flow index) as determined using ASTM D1238-10 (190° C./2.16 kg) which ranges from 0.1 to 125 g/10 min and a density in the range from 900 kg/m³ to less than 940 kg/m³ as determined using ASTM D1505-10 may be obtained. For example, the density of the linear low density polyethylene ranges from about 915 kg/m³ to less than 940 kg/m³, for example between 915 and 925 kg/m³.

For example, the melt flow index of the linear low density polyethylene ranges from 0.3 to 3 g/10 min, for example from 0.5 to 1.5 g/10 min. Preferably, the α-olefin comonomer is present in an amount of about 5 to about 20 percent by weight of the ethylene-α-olefin copolymer, more preferably in an amount of from about 7 to about 15 percent by weight of the ethylene-α-olefin copolymer.

The solvent or dispersant used in the process to produce olefin polymers may be any organic solvent usually used for the polymerization. Examples of solvents are benzene, toluene, xylene, butane, pentane, hexane, heptane, cyclohexane and methylene chloride. The polymerization can also be carried out in a process wherein the monomers are solvents or dispersants.

In the process to produce olefin polymers, the polymerization conditions, like for example temperature, time, pressure, monomer concentration can be chosen within wide limits. The polymerization temperature is in the range from −100 to 300° C., preferably 0 to 200° C., more preferably 10 to 120° C. The polymerization time is in the range of from 10 seconds to 20 hours, preferably from 1 minute to 10 hours, more preferably from 5 minutes to 5 hours. The ethylene pressure during polymerization is in the range from 1 to 3500 bar, preferably from 1 to 2500 bar, more preferably from 1 to 1000 bar, even more preferably from 1 to 500 bar, most preferably from 1 to 100 bar. The molecular weight of the polymer can be controlled by use of hydrogen in the polymerization. The polymerization may be conducted by a batch process, a semicontinuous process or a continuous process and may also be conducted in two or more steps of different polymerization conditions. The polyolefin produced is separated from the polymerization solvent and dried by methods known to a person skilled in the art.

The polymerization may be performed via a gas phase process, via a solution or via a slurry process. Such processes can be carried out in a single reactor or in multiple reactors, for example a cascade of reactors.

The production processes of polyethylene are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

The various processes may be divided into solution polymerisation processes employing homogeneous (soluble) catalysts and processes employing supported (heterogeneous) catalysts. The latter processes include both slurry and gas phase processes. The invention is also directed to an olefin polymer, for example polyethylene, preferably LLDPE, MDPE, and HDPE obtainable or obtained by the process of the invention, for example by copolymerizing ethylene and at least one α-olefin in the presence of a catalyst according to the invention.

As defined herein, in linear polyethylene, the term "linear" means that the polymer is substantially linear, and may contain long chain branches.

"Long chain branching" (LCB) means a chain length longer than the short chain branch that results from the incorporation of the α-olefin(s) into the polymer backbone. Each long chain branch will have a similar comonomer distribution as the polymer backbones and can be as long as the polymer backbone to which it is attached.

As a practical matter, current $^{13}$C nuclear magnetic resonance spectroscopy cannot distinguish the length of a long chain branch in excess of six carbon atoms. However, there are other known techniques useful for determining the presence of long chain branches in ethylene polymers. Two such methods are gel permeation chromatography coupled with a low angle laser light scattering detector (GPC-LALLS) and gel permeation chromatography coupled with a differential viscometer detector (GPCDV). The use of these techniques for long chain branch detection and the underlying theories have been well documented in the literature.

See, for example, Zimm, G.H. and Stockmayer, W. H., J. Chem. Phys., 17,1301 (1949) and Rudin, A., Modern Methods of Polymer Characterization, John Wiley & Sons, New York (1991 pp. 103-112),), or for example: Doerpinghaus, P. J., Baird, G. B., J. Rheol. 47(3), 717-736 (2003).

It has been found that with the metallocene complex of the invention or with the composition of the invention wherein the metallocene complex of the invention is present on a support, it is possible to produce polyethylene from ethylene and at least one α-olefin, for example an α-olefin having up to 8 carbon atoms, with a high incorporation of the at least one α-olefin.

The amount of incorporation of the at least one α-olefin, for example an α-olefin in the polyethylene is expressed by the amount of branches per 1000 carbon atoms. The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2 & 3, p. 285-297).

Therefore, the invention also relates to a polyolefin, preferably polyethylene, more preferably linear low density polyethylene (LLDPE). The low density polyethylene, for example LLDPE, preferably has an amount of branches per 1000 carbon atoms as determined using $^{13}C$ NMR of at least 1, for example of at least 2, for example at least 5 and/or for example at most 30, for example at most 25, for example at most 23.

The number average molecular weight (Mn) of the polyolefin, for example polyethylene, for example LLDPE of the invention may vary between wide ranges and may for example be in the range from 1000 to 800000 Da.

For example, the Mn of the polyolefin of the invention may be at least 1500, for example at least 2000, for example at least 20,000, for example at least 50,000 and/or for example at most 150,000, for example at most 110,000, for example at most 100,000, for example at most 70,000.

The weight average molecular weight (Mw) of the polyolefin, for example polyethylene, for example LLDPE of the invention may also vary between wide ranges and may for example be in the range from 1500 to 900000 Da. For example, the Mw of the polyolefin of the invention may be at least 2500, for example at least 10,000, for example at least 50,000, for example at least 100,000 and/or for example at most 400,000, for example at least 350,000, for example at most 300,000, for example at most 250,000.

For purpose of the invention, the Mw and Mn are determined using SEC (Size Exclusion Chromatography) using 1,2,4-trichlorobenzene as an eluent, and calibrated using linear polyethylene standards.

The molecular weight distribution (that is Mw/Mn) of the polyolefin of the invention may for example vary from from 2 to 5, from 2.1 to 4.5 or from 2.5 to 4.

The crystallinity temperature (Tc) of the polyolefin of the invention may for example be in the range from 90 to 120° C. The melt temperature (Tm) of the polyolefin of the invention may for example be in the range from 100 to 140° C.

For purpose of the invention, the $T_m$ and $T_c$ are determined using Differential Scanning calorimetry according to ASTM D 3418-08 using a scan rate of 10° C./min on a sample of 10 mg and using the second heating cycle The polyolefin obtained or obtainable by the process of the invention may be mixed with suitable additives.

Examples of suitable additives for polyethylene include but are not limited to the additives usually used for polyethylene, for example antioxidants, nucleating agents, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

The polyolefins of the invention and compositions comprising said polyolefins may suitably be used for the manufacture of articles. For example, the polyolefins and compositions of the invention may be manufactured into film, for example by compounding, extrusion, film blowing or casting or other methods of film formation to achieve, for example uniaxial or biaxial orientation. Examples of films include blown or cast films formed by coextrusion (to form multilayer films) or by lamination and may be useful as films for packaging, for example as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Other applications may be blow moulding bottles, pipes, caps, closures and the like.

Therefore, in another aspect, the invention also relates to articles comprising the polyolefins obtainable by the process of the invention.

In yet another aspect, the invention also relates to use of the olefin polymers obtainable by the process according to the invention for the preparation of articles, for example for the preparation of films.

In yet another aspect, the invention relates to a process for the preparation of articles using the polyolefin according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will hereafter be elucidated by way of the following examples, without being limited thereto.

EXAMPLES

Test Methods

Melt Index

The melt index is measured according to ASTM D-1238-10 Condition F (190° C., 21.6 kg).

Density

The density is determined according to ISO1872-2. The samples were prepared and pressed according to ISO1872-2 and annealed by boiling in water for half an hour, then left to cool for 16 hours in the same water after which the samples were measured.

Molecular Weight Distribution.

Sample Preparation

The polymer samples were dissolved in 1,2,4-trichlorobenzene (TCB) in the concentration range of 0.3-1.3 mg/ml during 4 h at 160° C. and stabilized with 1 g/l di-tertbutylparacresol (DBPC). The solutions were filtered over a 0.45 μm filter at high temperature (160° C.) prior to injection.

SEC-DV

The separation of the polymer according to molar mass is performed using an Agilent PL220 Size Exclusion Chromatograph (SEC) equipped with 3 Agilent PL Olexis columns. The SEC system is operated at 160° C. and a flow of 1.0 mL/min. Detectors used are a built-in refractive index detector and a PL BV-400 viscometer Branches/1000 C The amount of branches is determined with the aid of FTIR which was calibrated using representative samples that previously have been measured using 13C-NMR.

FTIR of the resulting polymers were measured by converting the PE powder in to a hot-pressed thin film. The film is measured in transmission IR mode. The height of a band corresponding to CH3 bending vibrations (1380-1375 cm-1) is measured and corrected for the film-thickness using 4400-4000 cm-1 spectral region. The obtained value is then compared with a calibration line. The calibration line is established upfront using reference ethylene/1-olefin polymers characterized by 13C NMR.

Synthesis of Complexes (Ill), (IV), VI, VII, VIII & IX

Starting Materials and precursor ligands 2-Methylnaphthalene (Acros), N-bromosuccinimide (Acros), azobisisobutyronitrile (Merck), diethyl malonate (Acros), 2,2'-dibromobiphenyl (Aldrich), trimethylborate (Aldrich), Pd(P$^t$Bu$_3$)$_2$ (Aldrich), 2.5 M $^n$BuLi in hexanes (Chemetall), 1.6 M $^t$BuLi in pentane (Aldrich), 2.5 M MeMgBr in ether (Aldrich), ZrCl$_4$ (Merck), HfCl$_4$ (<1% Zr, Strem), sodium metal (Merck), dichloro(diethyl)silane (ABCR), Na$_2$SO$_4$ (Akzo Nobel), 12 M HCl (Merck), P$_4$O$_{10}$ (Merck), methanesulfonic acid (Aldrich), K$_2$CO$_3$ (Merck), NH$_4$Cl (Merck), silica gel 60, 40-63 um (Merck), NaBH$_4$ (Aldrich), TsOH (Aldrich), KOH (Merck), magnesium turnings (Acros), CCl$_4$ (Merck), ethanol (Merck), anhydrous ethanol (Acros), toluene (Merck), anhydrous toluene (Acros), dichloromethane (Merck), hexane (Merck), THF (Merck), methanol (Merck), DMSO (Merck), diethyl ether (Merck), DME (Acros), DMSO-d$_6$ (Deutero GmbH) and CDCl$_3$ (Deutero GmbH) were used as received. Toluene, hexane, C$_6$D$_6$ and CDCl$_3$ (for organometallic synthesis) were dried over molecular sieves 4A. Diethyl ether and THF (for organometallic syntheses) were dried over sodium benzophenone ketyl. 2,2'-Dibromo-4,4'-di-tert-butylbiphenyl was prepared by literature method [Corey, J. Y.; Chang, L. S. *J. Organomet Chem.* 1986, 307, 7]. 2,2'-Dibromo-4,4',5,5'-tetramethylbiphenyl was prepared from ortho-xylene (Acros) according to the literature method [Ma, J.; Li, G.; Qiao, Y.; Tu, J.; Liu, S.; Xu, F. *Synlett* 2015, 26, 1991]. 1,2,6,7,8,9-Hexahydro-3H-cyclopenta[a]naphthalen-3-one was prepared from tetralin by the literature method [Iychenko, P. V.; Nifanrev, I. E.; Ustynyuk, L. Yu.; Ezerskii, V. A. Russ. *Chem. Bull., Int. Ed.* 2009, 58, 929] as a mixture with 2,3,5,6,7,8-hexahydro-1H-cyclopenta[b]naphthalen-1-one; the isomers were separated by fractional crystallization from n-hexane 2-(Bromomethyl)naphthalene

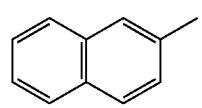

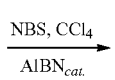

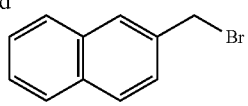

A mixture of 142.2 g (1.0 mol) of 2-methylnaphthalene, 178.0 g (1.0 mol) of N-bromosuccinimide and 1.0 g of azobisisobutyronitrile in 1 L of 001$_4$ was refluxed for 4 h. Further on, this mixture was cooled to room temperature, the precipitated succinimide was filtered off, and the filtrate was evaporated to dryness. The residue was distilled in vacuum (b.p. 100-120° C./7 mm Hg) to give 207.0 g of 2-(bromomethyl)naphthalene contaminated with starting 2-methylnaphthalene. On the evidence of NMR spectroscopy the obtained product included ca. 790 mmol of 2-(bromomethyl)naphthalene. This product was further used without an additional purification.

$^1$H NMR (CDCl$_3$): δ 7.90-7.80 (m, 4H), 7.58-7.50 (m, 3H), 4.69 (s, 2H). Diethyl 2-(naphthalen-2-ylmethyl)malonate

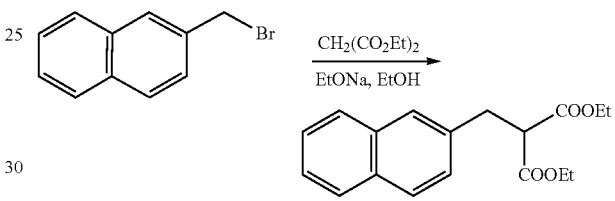

To a solution of sodium ethoxide obtained from 21.72 g (0.94 mol) of sodium and 1 L of dry ethanol 252.1 g (1.57 mol) of diethyl malonate was added. This mixture was stirred for 10 min, and then a solution of 2-bromomethylnaphthalene (prepared above) in 400 ml of anhydrous toluene was added dropwise for 60 min. The resulting mixture was refluxed for 4 h, and then ethanol was distilled off. To the residue 500 ml of water was added, and the obtained orange mixture was extracted with 3×300 ml of dichloromethane. The combined extract was dried over Na$_2$SO$_4$ and evaporated to dryness. Crude product was distilled under reduced pressure to give 212.9 g (90%) of diethyl 2-(naphthalen-2-ylmethyl)malonate as a colorless oil, b.p. 150-180° C./5 mbar.

Anal. calc. for C$_{18}$H$_{20}$O$_4$: C, 71.98; H, 6.71. Found: C, 72.14; H, 6.99.

$^1$H NMR (CDCl$_3$): δ 7.82-7.74 (m, 3H), 7.68 (s, 1 H), 7.49-7.40 (m, 2H), 7.35 (dd, J=8.5 Hz, J=1.6 Hz, 1H), 4.22-4.12 (m, 4H), 3.78 (t, J=7.9 Hz, 1H), 3.41 (d, J=7.9 Hz, 2H), 1.2 (t, J=7.2 Hz, 6H).

3-(Naphthalen-2-yl)propanoic acid

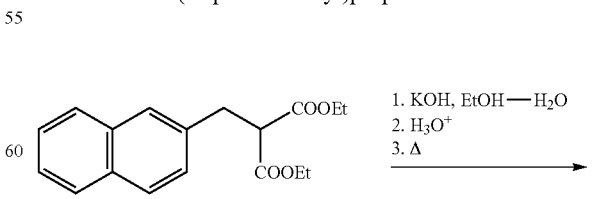

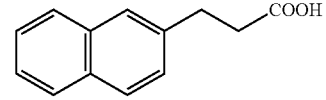

To a rapidly stirred mixture of 212.9 g (0.71 mol) of diethyl 2-(naphthalen-2-ylmethyl)malonate and 200 ml of ethanol a solution of 119 g (2.13 mol) of KOH in 300 ml of water was added dropwise. The obtained mixture was refluxed for 4 h to saponificate the ester. Ethanol and water were distilled off until distillation temperature reached 95° C., and then 2000 ml of water and 12 M HCl (to pH 1) were added to the residue. The formed substituted malonic acid was filtered off, washed by 1 L of water, and then decarboxylated at 180° C. This procedure gave 144 g (~99%) of 3-(naphthalen-2-yl)propanoic acid as a brown oil which completely crystallized upon standing at room temperature.

$^1$H NMR (CDCl$_3$): δ 11.7 (br.s, 1H). 7.83-7.72 (m, 3H), 7.64 (s, 1H), 7.48-7.39 (m, 2H), 7.33 (dd, J=8.3 Hz, J=1.2 Hz, 1H), 3.11 (t, J=7.8 Hz, 2H), 2.77 (t, J=7.8 Hz, 2H).

2,3-Dihydro-1H-cyclopenta[a]naphthalen-1-one

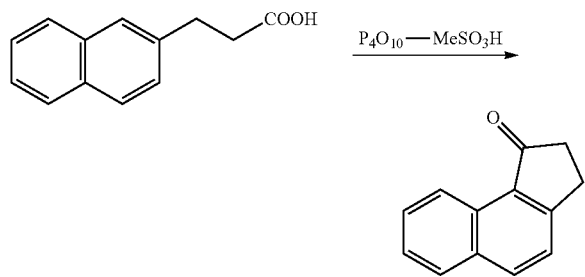

In a flask equipped with a mechanical stirrer to the Eaton's reagent prepared from 165.0 g of P$_4$O$_{10}$ and 840 ml of methanesulfonic acid 144.0 g (ca. 720 mmol) of 3-(naphthalen-2-yl)propanoic acid was added portionwise at room temperature. The formed mixture was stirred overnight, then poured into 2 L of ice-cold water. Crude product was extracted with 3×500 ml of dichloromethane. The combined extract was washed with aqueous K$_2$CO$_3$, dried over Na$_2$SO$_4$, and then evaporated to dryness. The residue was subjected to flash chromatography using 600 ml of silica gel 60 (40-653 um) and mixture of hexane and dichloromethane in the ratio 1:1 as eluent to give 105.0 g (80%) of the title product as a brownish solid.

Anal. calc. for C$_{13}$H$_{10}$O: C, 85.69; H, 5.53. Found: C, 85.98; H, 5.75.

$^1$H NMR (CDCl$_3$): δ 9.12 (d, J=8.5 Hz, 1H), 7.93 (d, J=8.3 Hz, 1H), 7.81 (d, J=8.1 Hz, 1H), 7.61 (ddd, J=8.3 Hz, J=7.1 Hz, J=1.2 Hz, 1H), 7.50 (ddd, J=8.1 Hz, J=7.1 Hz, J=1.0 Hz, 1H), 7.39 (d, J=8.3 Hz, 1H), 3.12-3.04 (m, 2H), 2.75-2.65 (m, 2H). $^{13}$C{$^1$H} NMR (CDCl$_3$): δ 207.26, 158.26, 135.47, 132.41, 130.81, 129.23, 128.65, 127.90, 126.39, 123.87, 123.76, 36.73, 25.99.

3H-Cyclopenta[a]naphthalene

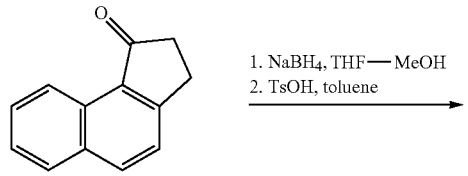

1. NaBH$_4$, THF—MeOH
2. TsOH, toluene

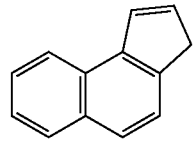

To a solution of 105.0 g (0.58 mol) of 2,3-dihydro-1H-cyclopenta[a]naphthalen-1-one in 600 ml of THF 18.55 g of NaBH$_4$ was added in one portion. Then, to this mixture cooled to 0° C. 300 ml of methanol was added dropwise for 2 h. The resulting mixture was stirred overnight at room temperature and then evaporated to dryness. After that 0.5 M HCl was added to the residue, and the obtained mixture was thoroughly shaken. Then, the mixture was extracted with 3×300 ml of dichloromethane. The combined organic extract was dried over Na$_2$SO$_4$ and then evaporated to dryness. The residue was dissolved in 200 ml of toluene, and the obtained solution was evaporated again. Finally, to the residue dissolved in 600 ml of toluene 0.75 g of TsOH was added. The obtained solution was refluxed with Dean-Stark trap for 10 min, cooled to room temperature, and then passed through a short layer of silica gel 60 (40-63 um). The filtrate was evaporated to dryness, and crude product was isolated from the residue by flash chromatography using 400 ml of silica gel 60 (40-63 um) and hexane as eluent to give ~75 g of the greenish viscous oil. This oil was distilled in vacuum to give 74.23 g (77%) of the title product as a colorless crystalline solid, b.p. 145-155° C./7 mm Hg.

Anal. calc. for C$_{13}$H$_{10}$: C, 93.94; H, 6.06. Found: C, 93.86; H, 6.19.

$^1$H NMR (CDCl$_3$): δ 8.09 (d, J=8.1 Hz, 1H), 7.86 (d, J=8.4 Hz, 1H), 7.66 (d, J=8.4 Hz, 1H), 7.58 (d, J=8.1 Hz, 1H), 7.50-7.38 (m, 3H), 6.68 (dt, J=5.7 Hz, J=1.7 Hz, 1H), 3.5 (s, 2H). $^{13}$C{$^1$H} NMR (CDCl$_3$): δ 141.19, 140.93, 134.23, 132.53, 129.51, 128.33, 127.79, 125.52, 124.85, 124.71, 123.77, 122.40, 40.31.

2-Bromo-2,3-dihydro-1H-cyclopenta[a]naphthalen-1-ol

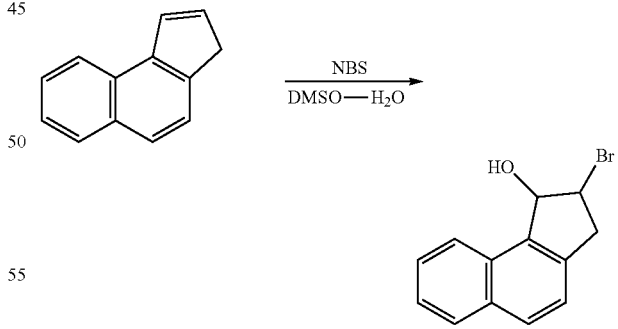

To a solution of 74.23 g (0.45 mol) of 3H-cyclopenta[a]naphthalene in 450 ml of DMSO 16 ml (0.90 mol) of water was added. Then, 84.10 g (0.47 mol) of N-bromosuccinimide was added portionwise for 10 min. After complete addition the obtained mixture was stirred overnight at room temperature. Further on, 500 ml of water and 1200 ml of ethyl acetate were added. The organic layer was separated, and the aqueous layer was additionally extracted with 3×150 ml of ethyl acetate. The combined organic extract was washed with 5×500 ml of water, dried over $Na_2SO_4$, and evaporated to dryness. The residue was washed with 300 ml of hexane on glass filter (G3) and then dried in vacuum. This procedure gave 118.0 g (99%) of the title product as a gray solid.

$^1H$ NMR ($CDCl_3$): δ 8.07 (d, J=8.1 Hz, 1H), 7.84 (d, J=8.1 Hz, 1H), 7.79 (d, J=8.3 Hz, 1H), 7.51 (t, J=7.2 Hz, 1H), 7.46 (t, J=7.2 Hz, 1H), 7.3 (d, J=8.3 Hz, 1H), 5.76 (d, J=3.0 Hz, 1H), 4.47-4.38 (m, 1H), 3.78 (dd, J=17.2 Hz, J=6.7 Hz, 1H), 3.31 (dd, J=17.2 Hz, J=4.2 Hz, 1H), 2.6 (br.s, 1H). $^{13}C\{^1H\}$ NMR ($CDCl_3$): δ 138.36, 135.82, 133.21, 130.25, 129.96, 128.58, 126.91, 125.62, 123.70, 122.72, 83.69, 54.26, 41.83.

2-Bromo-3H-cyclopenta[a]naphthalene

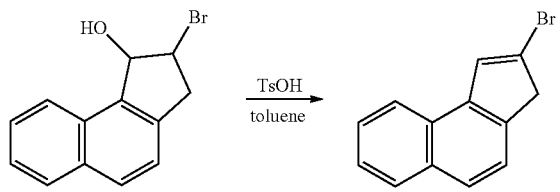

To a solution of 1 g of TsOH in 1 L of warm toluene a solution of 118.0 g (0.44 mol) of 2-bromo-2,3-dihydro-1H-cyclopenta[a]naphthalen-1-ol was added in one portion. The reaction mixture was refluxed for one minute and then poured into 300 ml of aqueous $K_2CO_3$. The organic layer was separated, dried over $Na_2SO_4$ and evaporated. The residue was purified by flash chromatography on silica gel 60 (40-63 um, eluent: hexane) to give 75.5 g (70%) of the title product as a white crystalline solid.

Anal. calc. for $C_{13}H_9Br$: C, 63.70; H, 3.70. Found: C, 63.93; H, 3.88.

$^1H$ NMR ($CDCl_3$): δ 7.96 (d, J=8.3 Hz, 1H), 7.85 (d, J=8.1 Hz, 1H), 7.65 (d, J=8.1 Hz, 1H), 7.53-7.41 (m, 4H), 3.71 (s, 2H). $^{13}C\{^1H\}$ NMR ($CDCl_3$): δ 140.32, 140.22, 132.52, 130.71, 128.41, 126.76, 125.94, 125.28, 124.97, 124.33, 123.48, 121.60, 46.60.

Dibenzo[c,e][1,2,7]oxadiborepine-5,7-diol

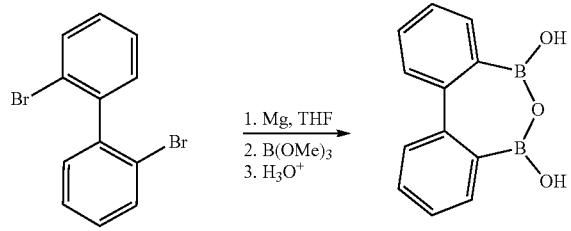 [SMILES: Brc1ccccc1-c1ccccc1Br ; OB1OB(O)c2ccccc2-c2ccccc21]

A white suspension of 2,2'-di(magnesium bromide)biphenyl was obtained by addition of a solution of 62.4 g (200 mmol) of 2,2'-dibromobiphenyl in 900 ml of THF to 14.6 g (601 mmol, 3 eq.) of magnesium turnings during 1.5 h followed by 3 h stirring at reflux. This suspension was cooled to −78° C., and 52 g (500 mmol, 2.5 eq.) of trimethylborate was added in one portion. The resulting heterogeneous mixture was stirred for 1 h at room temperature and additionally refluxed for 3 h. The boronic ester was hydrolyzed by careful addition of 1 liter of 2 M HCl at +5° C. followed by stirring for 1 h at room temperature (an excess of magnesium also disappeared). Further on, 600 ml of diethyl ether was added, the organic layer was separated, and the aqueous one was additionally extracted with 2×500 ml of diethyl ether. The combined organic extract was evaporated, and the residue was dissolved in 1000 ml of diethyl ether. This solution was dried over $Na_2SO_4$ and then evaporated to dryness to give yellowish oil including some crystalline material. The residue was dissolved in 50 ml of toluene, and then 800 ml of n-hexane was added. The resulting suspension was stirred for 20 min, the precipitate was filtered off and then dried in vacuum. This procedure gave 22.8 g (51%, the average from four runs) of dibenzo[c,e][1,2,7]-oxadiborepine-5,7-diol which, in fact, is cyclic anhydride of biphenyl-2,2'-diyldiboronic acid.

Anal. calc. for $C_{12}H_{10}B_2O_3$: C, 64.39; H, 4.50. Found: C, 64.15; H, 4.28.

$^1H$ NMR (DMSO-$d_6$): δ 9.14 (s, 2H), 7.70 (dd, J=7.4 Hz, J=1.0 Hz, 2H), 7.57 (d, J=7.4 Hz, 2H), 7.52 (td, J=7.4 Hz, J=1.2 Hz, 2H), 7.36 (td, J=7.4 Hz, J=1.0 Hz, 2H). $^{13}C\{^1H\}$ NMR (DMSO-$d_6$): δ 145.10, 133.99, 133.71 (br.$), 130.55, 129.30, 126.38.

3,9-Di-tert-butyldibenzo[c,e][1,2,7]oxadiborepine-5,7-diol

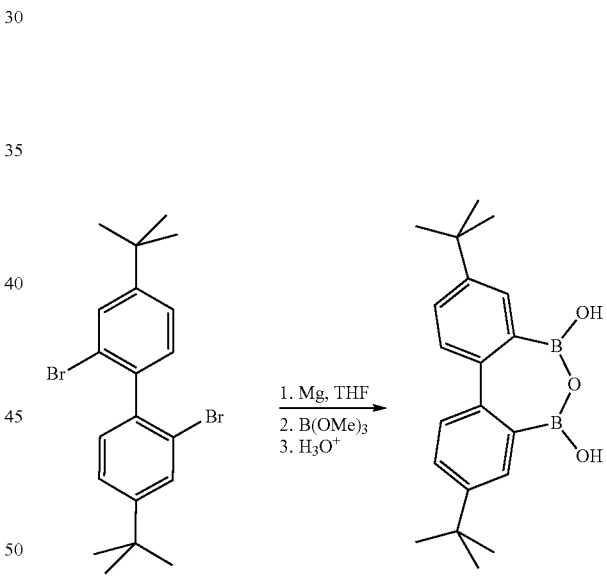

A white suspension of 2,2'-di(magnesium bromide)-4,4'-di-tert-butylbiphenyl was obtained via addition of a solution of 24.5 g (57.75 mmol) of 2,2'-dibromo-4,4'-di-tert-butylbiphenyl in 400 ml of THF to 4.21 g (173.2 mmol, 3 equiv.) of magnesium turnings during 1.5 h followed by 5 h stirring at reflux. This suspension was cooled to −50° C., and 24 g (231 mmol, 4 equiv.) of trimethylborate was added in one portion. The resulting heterogeneous mixture was stirred for 1 h at room temperature and then additionally refluxed for 3 h. The boronic ester was hydrolyzed by careful addition of 350 ml of 2 M HCl at +5° C. followed by stirring for 4 h at room temperature (an excess of magnesium disappeared also). Further on, 500 ml of diethyl ether was added, the organic layer was separated, and the aqueous one was additionally extracted with 4×500 ml of diethyl ether. The combined organic extract was evaporated, and the residue was dissolved in 500 ml of diethyl ether. This solution was dried over $Na_2SO_4$ and then evaporated to dryness to give a white solid mass. This mass was heated with 50 ml of toluene, and the resulting white suspension was cooled to room temperature. The precipitate was filtered off (G3) and then dried in vacuum. This procedure gave 10.51 g (51%) of 3,9-di-tert-butyldibenzo[c,e][1,2,7]oxadiborepine-5,7-diol.

Anal. calc. for $C_{20}H_{26}B_2O_3$: C, 71.48; H, 7.80. Found: C, 71.66; H, 8.05.

$^1$H NMR (DMSO-$d_6$): δ 9.07 (s, 2H), 7.71 (d, J=2.2 Hz, 2H), 7.53 (dd, J=8.3 Hz, J=2.2 Hz, 2H), 7.49 (d, J=8.3 Hz, 2H), 1.31 (s, 18H). $^{13}$C{$^1$H} NMR (DMSO-$d_6$): δ 148.03, 142.27, 132.98 (br.s), 130.53, 128.92, 127.52, 34.11, 31.06.

2,3,9,10-Tetramethyldibenzo[c,e][1,2,7]oxadiborepine-5,7-diol

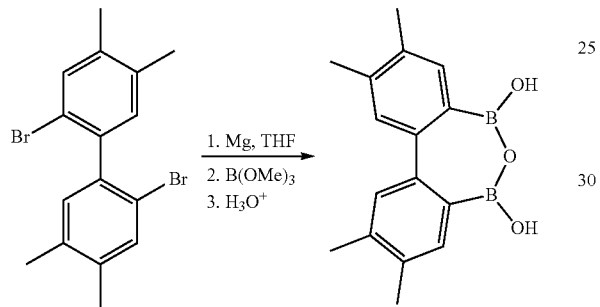

A white suspension of 2,2'-di(magnesium bromide)-4,4',5,5'-tetramethylbiphenyl was obtained via addition of a solution of 51.65 g (140 mmol) of 2,2'-dibromo-4,4',5,5'-tetramethylbiphenylin 900 ml of THF to 10.23 g (420 mmol, 3 equiv.) of magnesium turnings during 1.5 h followed by 3 h stirring at reflux. This suspension was cooled to −78° C., and 36.4 g (350 mmol, 2.5 equiv.) of trimethylborate was added in one portion. The resulting heterogeneous mixture was stirred overnight at room temperature. The boronic ester was hydrolyzed by careful addition of 1 liter of 2 M HCl at +5° C. followed by stirring for 3 h at room temperature (an excess of magnesium disappeared also). Further on, 300 ml of diethyl ether was added, the organic layer was separated, and the aqueous one was additionally extracted with 3×250 ml of diethyl ether. The combined organic extract was evaporated, and the residue was dissolved in 300 ml of diethyl ether. This solution was dried over $Na_2SO_4$ and then evaporated to dryness to give yellowish oil including some crystalline material. The residue was dissolved in 40 ml of toluene, and then 700 ml of n-hexane was added. The resulting suspension was stirred for 20 min, the precipitate was filtered off (G3) and then dried in vacuum. This procedure gave 24.2 g (58%) of 2,3,9,10-tetramethyldibenzo[c,e][1,2,7]oxadiborepine-5,7-diol.

Anal. calc. for $C_{16}H_{18}B_2O_3$: C, 68.65; H, 6.48. Found: C, 68.83; H, 6.70.

$^1$H NMR (DMSO-$d_6$): δ 8.94 (s, 2H), 7.45 (s, 2H), 7.35 (s, 2H), 2.28 (s, 6H), 2.24 (s, 6H). $^{13}$C{$^1$H} NMR (DMSO-$d_6$): δ 143.01, 138.60, 135.39, 133.88, 130.53 (br.s), 130.26, 19.58, 18.84.

[2,2-Di-(η$^5$-cyclopenta[a]naphthalen-2-yl)biphenyl]zirconium dichloride (III) and [2.2% Di-(η$^5$-cyclopenta[a]naphthalen-2-yl)biphenyl]hafnium dichloride (IV)

2,2'-Biphenyl-2,2'-diylbis-3H-cyclopenta[a]naphthalene

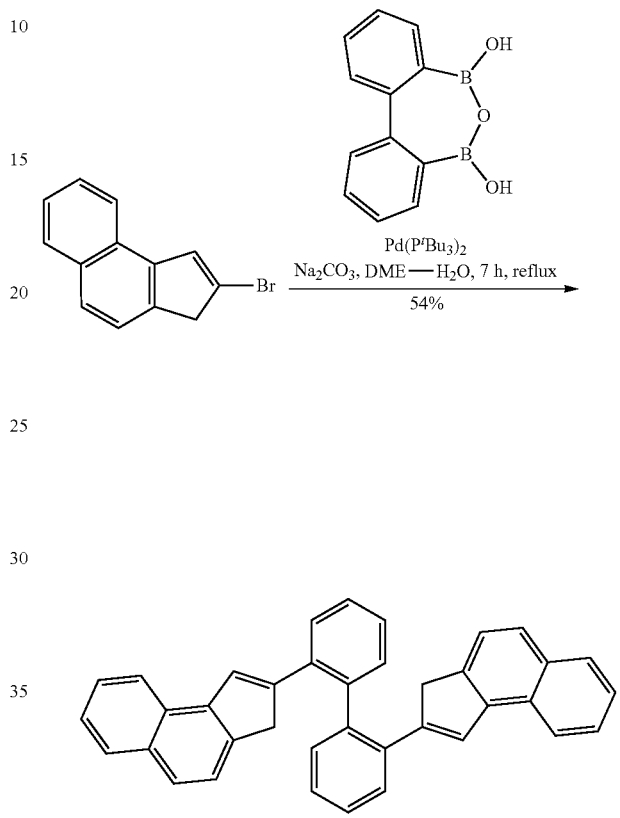

A mixture of 16.1 g (65.7 mmol) of 2-bromo-3H-cyclopenta[a]naphthalene, 6.72 g (30.0 mmol) of dibenzo[c,e][1,2,7]-oxadiborepine-5,7-diol, 13.7 g (172 mmol) of $Na_2CO_3$, 1.0 g (2.0 mmol) of Pd(P$^t$Bu$_3$)$_2$, 75 ml of water, and 190 ml of 1,2-dimethoxyethane was refluxed for 7 h. The main part of 1,2-dimethoxyethane was distilled off on rotary evaporator, and then 500 ml of dichloromethane and 500 ml of water were added to the residue. The organic layer was separated, the aqueous layer was additionally extracted with 100 ml of dichloromethane. The combined organic extract was evaporated to dryness to give a black mass. The product was isolated by flash-chromatography on silica gel 60 (40-63 um; eluent: dichloromethane/hexanes=10:1 and then 5:1, vol.). This procedure gave 7.87 g (54%) of white crystalline 2,2'-biphenyl-2,2'-diylbis-3H-cyclopenta[a]naphthalene as a mixture of two isomers.

Anal. calc. for $C_{38}H_{26}$: 5C, 94.57; H, 5.43. Found: C, 94.80; H, 5.65.

$^1$H NMR (CDCl$_3$): δ 7.85-7.74 (m, 2H), 7.68-7.46 (m, 6H), 7.46-7.19 (m, 12H), 6.77 and 6.75 (2s, 1H), 6.35 and 6.33 (2s, 2H), 3.65-3.10 (m, 4H).

[2,2-Bis(η⁵-1H-cyclopenta[a]naphthalene-2-yl)biphenyl]zirconium dichloride (III)

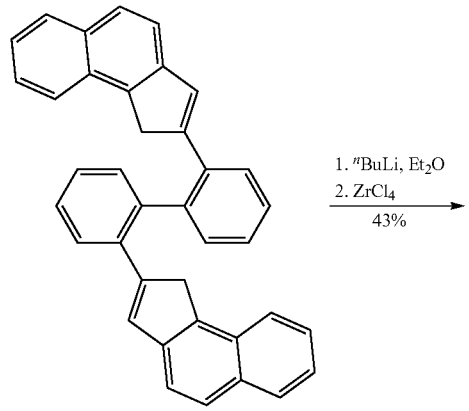

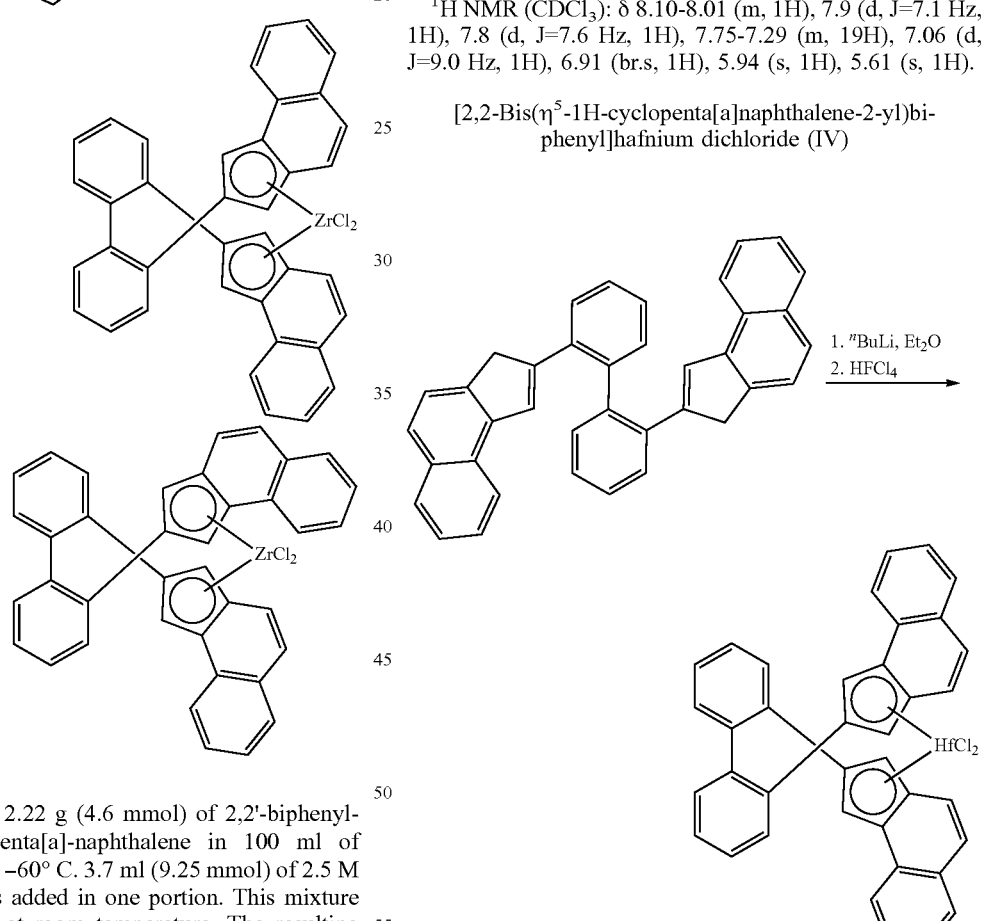

To a suspension of 2.22 g (4.6 mmol) of 2,2'-biphenyl-2,2'-diylbis-3H-cyclopenta[a]-naphthalene in 100 ml of diethyl ether cooled to −60° C. 3.7 ml (9.25 mmol) of 2.5 M ⁿBuLi in hexanes was added in one portion. This mixture was stirred overnight at room temperature. The resulting colorless solution with white precipitate was cooled to −50° C., and 1.08 g (4.63 mmol) of ZrCl₄ was added. The reaction mixture was stirred for 24 h resulting in yellow solution with a lot of yellow heavy precipitate. This mixture was evaporated to dryness, and the residue was heated with 300 ml of toluene. The obtained hot mixture was filtered through glass frit (G4), the mother liquor was evaporated to a volume ca. 80 ml and then heated to dissolve the precipitate. Yellow crystals precipitated from this solution for 3 h at room temperature were filtered off and then dried in vacuum. This procedure gave 0.27 g of [2,2'-di-(η⁵-cyclopenta[a]naphthalen-2-yl)biphenyl]zirconium dichloride as a single isomer A.

The residue after very first extraction was additionally extracted with 125 ml of hot toluene. The formed mixture was filtered through glass frit (G4). Crystals precipitated from the obtained filtrate overnight at room temperature were collected. The mother liquor was used for one more extraction. The combined precipitate from two extractions was dried in vacuum. This procedure gave 0.34 g of a ca. 85:15 mixture of the isomeric complexes A and B. The residue after very last extraction as well as the mother liquors were used for one more extraction (total volume of toluene was ca. 350 ml). The obtained filtrate was evaporated to ca. 10 ml, the formed precipitate was filtered off and dried in vacuum. This procedure gave 0.66 g of a ca. 76:24 mixture of the isomeric complexes A and B. Thus, the total yield of [2,2'-di-(η⁵-cyclopenta[a]naphthalen-2-yl)biphenyl]zirconium dichloride isolated after this synthesis was 1.27 g (43%).

Anal. calc. for $C_{38}H_{24}Cl_2Zr$: C, 71.07; H, 3.76. Found: C, 71.27; H, 3.89.

¹H NMR (CDCl₃): δ 8.10-8.01 (m, 1H), 7.9 (d, J=7.1 Hz, 1H), 7.8 (d, J=7.6 Hz, 1H), 7.75-7.29 (m, 19H), 7.06 (d, J=9.0 Hz, 1H), 6.91 (br.s, 1H), 5.94 (s, 1H), 5.61 (s, 1H).

[2,2-Bis(η⁵-1H-cyclopenta[a]naphthalene-2-yl)biphenyl]hafnium dichloride (IV)

To a suspension of 10.74 g (22.25 mmol) of 2,2'-biphenyl-2,2'-diylbis-3H-cyclopenta[a]naphthalene in 400 ml of ether cooled to −50° C. 17.8 ml (44.5 mmol) of 2.5 M ⁿBuLi in hexanes was added in one portion. This mixture was stirred for 20 h at room temperature. The resulting yellowish solution with a white precipitate was cooled to −50° C., and 7.13 g (22.26 mmol) of HfCl₄ was added. The reaction mixture was stirred for 24 h resulting in yellowish solution with a lot of yellowish precipitate. The resulting mixture was evaporated to dryness, and the residue was heated with 400 ml of toluene. The obtained mixture was filtered while hot through glass frit (G4). Yellowish powder precipitated from the filtrate overnight at room temperature was collected and dried in vacuum. This procedure gave 1.67 g of [2,2'-bis(η5-1H-cyclopenta[a]naphthalene-2-yl)biphenyl]hafnium dichloride. The mother liquor was used for the following hot extraction of the filter cake. Yellowish powder precipitated overnight at room temperature from the second filtrate was collected and dried in vacuum. This procedure gave additional 0.4 g of [2,2'-bis(η5-1H-cyclopenta[a]naphthalene-2-yl)biphenyl]hafnium dichloride. Finally, the mother liquor was evaporated to ca. 40 ml. Again, yellowish powder precipitated from the filtrate overnight at room temperature was collected and dried in vacuum to give 2.2 g of [2,2'-bis(η5-1H-cyclopenta[a]naphthalene-2-yl)biphenyl]hafnium dichloride. Thus, the total yield of [2,2'-bis(η5-1H-cyclopenta[a]naphthalene-2-yl)biphenyl]hafnium dichloride isolated in this synthesis was 4.27 g (26%). All isolated fractions contained single ansa-metallocene of $C_1$-symmetry.

Anal. calc. for $C_{38}H_{24}Cl_2Hf$: C, 62.52; H, 3.31. Found: C, 62.60; H, 3.52.

$^1$H NMR (CDCl$_3$): δ 8.05-7.97 (m, 1H), 7.89-7.81 (m, 1H), 7.79-7.72 (m, 1H), 7.68 (d, J=7.7 Hz, 1H), 7.66-7.61 (m, 3H), 7.61-7.54 (m, 2H), 7.53-7.39 (m, 7H), 7.39-7.32 (m, 2H), 7.29 (d, J=9.1 Hz, 1H), 7.20-7.13 (m, 1H), 7.04 (d, J=9.1 Hz, 1H), 6.74 (d, J=2.4 Hz, 1H), 5.89 (d, J=2.2 Hz, 1H), 5.56 (d, J=2.6 Hz, 1H). $^{13}$C{$^1$H} NMR (CDCl$_3$): δ 138.55, 138.31, 132.95, 132.73, 132.52, 131.56, 131.52, 131.07, 130.22, 130.15, 129.77, 129.74, 129.40, 129.06, 129.02, 128.59, 128.52, 128.21, 127.96, 127.65, 127.32, 127.14, 127.02, 126.72, 125.28, 124.88, 123.29, 122.35, 121.97, 121.66, 103.08, 102.60, 100.62, 98.53 (resonances of several carbons coincided).

[2,2'-Bis(η5-1H-cyclopenta[a]naphthalene-2-yl)-4,4'-di-tert-butylbiphenyl]zirconium dichloride (VI)

2,2'-(4,4-Di-tert-butylbiphenyl-2,2'-diyl)bis-1/3H-cyclopenta[a]naphthalene

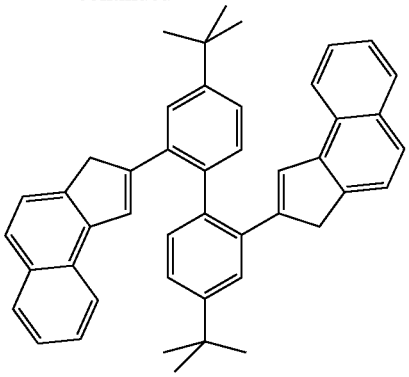

A mixture of 16.1 g (65.68 mmol) of 2-bromo-3H-cyclopenta[a]naphthalene, 10.06 g (29.94 mmol) of 3,9-di-tert-butyldibenzo[c,e][1,2,7]oxadiborepine-5,7-diol, 13.7 g (129 mmol) of Na$_2$CO$_3$, 1.0 g (1.96 mmol) of Pd(P$^t$Bu$_3$)$_2$, 75 ml of water, and 190 ml of 1,2-dimethoxyethane was refluxed for 7 h. Solid precipitated from the reaction mixture overnight at room temperature was filtered off (G3), and then dissolved in a mixture of 400 ml of dichloromethane and 200 ml of water. The organic layer was separated, the aqueous layer was additionally extracted with 100 ml of dichloromethane. The combined organic extract was evaporated to dryness, and the red residue was purified by flash-chromatography on silica gel 60 (40-63 um, 1000 g; eluent: hexanes-dichloromethane=5:1, then 3:1, vol.). The product-containing fractions were combined and then evaporated to ca. 50 ml. The formed precipitate was filtered off (G3) and then dried in vacuum. This procedure gave 11.68 g (66%) of 2,2'-(4,4'-di-tert-butylbiphenyl-2,2'-diyl)bis-1/3H-cyclopenta[a]naphthalene (a mixture of isomers) as a slightly yellowish fine crystalline solid.

Anal. calc. for $C_{46}H_{42}$: C, 92.88; H, 7.12. Found: C, 93.14; H, 7.29.

$^1$H NMR (CDCl$_3$): δ 7.86-7.75 (m, 2H); 7.68-7.47 (m, 6H); 7.48-7.22 (m, 10H); 6.66 (s), 6.63 (s), 6.40 (s) and 6.36 (s) {sum 2H}; 3.59-3.10 (m, 4H); 1.45-1.39 (m, 18H). $^{13}$C{$^1$H} NMR (CDCl$_3$,): δ 150.66, 150.61, 147.31, 142.59, 141.47, 141.44, 140.75, 139.95, 139.88, 138.14, 138.04, 137.98, 135.93, 135.89, 135.79, 135.75, 132.47, 131.22, 130.81, 130.73, 130.66, 130.53, 129.73, 128.69, 128.20, 127.70, 127.66, 127.51, 126.96, 125.94, 125.56, 125.52, 125.41, 125.38, 125.20, 124.81, 124.53, 124.35, 124.25, 123.66, 123.61, 123.30, 122.08, 120.30, 120.26, 41.93, 39.63, 34.69, 31.49.

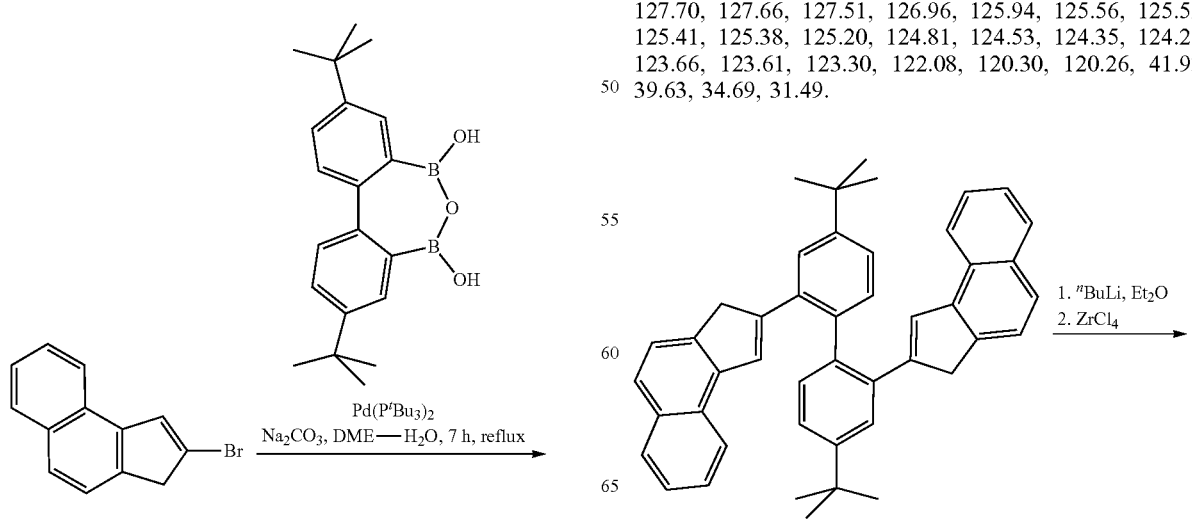

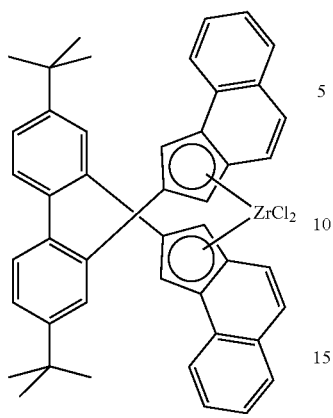

To a suspension of 11.65 g (19.59 mmol) of 2,2'-(4,4'-di-tert-butylbiphenyl-2,2'-diyl)bis-1/3H-cyclopenta[a]naphthalene in 400 ml of ether cooled to −50° C. 15.7 ml (39.25 mmol) of 2.5 M $^n$BuLi in hexanes was added in one portion. This mixture was stirred for 20 h at room temperature. The resulting slightly cloudy yellowish solution was cooled to −50° C., and 4.57 g (19.61 mmol) of ZrCl$_4$ was added. The reaction mixture was stirred for 24 h resulting in yellowish solution with yellowish precipitate. The resulting mixture was evaporated to dryness, and the residue was heated with 400 ml of toluene. This mixture was filtered while hot through glass frit (G4). Yellow powder precipitated from the filtrate overnight at room temperature was collected and then dried in vacuum. This procedure gave 5.22 g of [2,2'-bis(η$^5$-1H-cyclopenta[a]naphthalene-2-yl)-4,4'-di-tert-butylbiphenyl]zirconium dichloride, which contained only single complex of C$_1$-symmetry. The separated toluene solution was used for the following hot extraction of the filter cake. Yellow powder precipitated from the second filtrate overnight at room temperature was collected and dried in vacuum. This procedure gave additional 0.17 g of [2,2'-bis(q$^5$-1H-cyclopenta[a]naphthalene-2-yl)-4,4'-di-tert-butylbiphenyl]zirconium dichloride, which contained a mixture of two C$_2$-symmetric (complexes C$_2^I$ and C$_2^{II}$) and one C$_1$-symmetric complexes in ratio equal to ca. 20:70:10, respectively. Finally, the mother liquor was evaporated to ca. 25 ml. Again, yellow powder precipitated overnight at room temperature was collected and dried in vacuum to give 2.78 g of [2,2'-bis(η$^5$-1H-cyclopenta[a]naphthalene-2-yl)-4,4'-di-tert-butylbiphenyl]zirconium dichloride, which consisted of a mixture of two C$_2$-symmetric (complexes C$_2^I$ and C$_2^{II}$) and one C$_1$-symmetric complexes in ratio equal to ca. 10:30:60, respectively. Thus, the total yield of ansa-complexes isolated in this synthesis was 8.17 g (55%).

Ansa-zirconocene of C$_1$-symmetry.

Anal. calc. for C$_{46}$H$_{40}$C$_{12}$Zr: C, 73.18; H, 5.34. Found: C, 73.22; H, 5.47.

$^1$H NMR (CDCl$_3$): δ 8.14-8.05 (m, 1H), 7.89 (d, J=1.6 Hz, 1H), 7.76 (d, J=1.6 Hz, 1H), 7.74-7.58 (m, 4H), 7.54 (d, J=9.1 Hz, 1H), 7.50-7.32 (m, 9H), 7.30 (br.d, J=2.2 Hz, 1H), 7.06 (d, J=9.1 Hz, 1H), 6.92 (d, J=2.2 Hz, 1H), 5.92 (d, J=2.4 Hz, 1H), 5.66 (d, J=2.4 Hz, 1H), 1.54 (s, 9H), 1.49 (s, 9H).

[2,2'-Bis(η$^5$-1H-cyclopenta[a]naphthalene-2-yl)-4,4', 5,5-tetramethvlbiphenyl]zirconium dichloride (VII)

2,2'-(4,4',5,5'Tetramethylbiphenyl-2,2'-diyl)bis-3H-cyclopenta[a]naphthalene

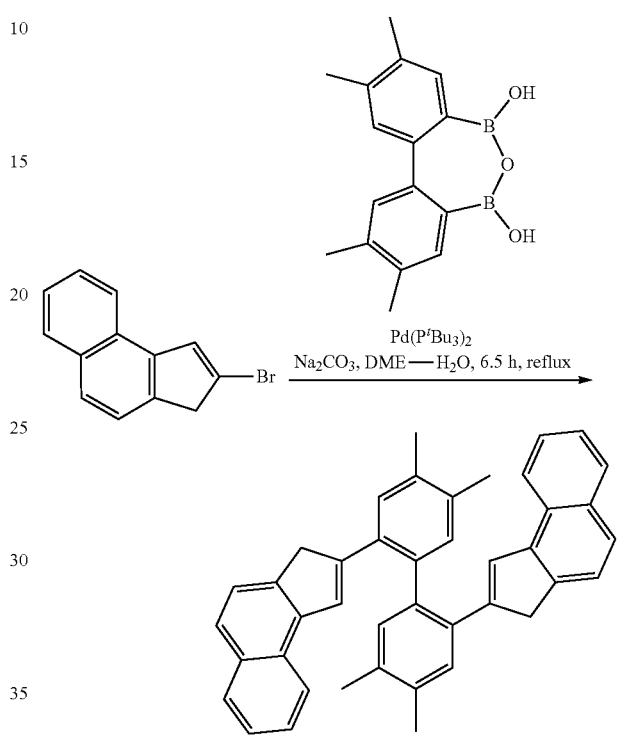

A mixture of 17.4 g (70.99 mmol) of 2-bromo-3H-cyclopenta[a]naphthalene, 9.05 g (32.33 mmol) of 2,3,9,10-tetramethyldibenzo[c,e][1,2,7]oxadiborepine-5,7-diol, 14.8 g (140 mmol) of Na$_2$CO$_3$, 1.0 g (1.96 mmol) of Pd(P$^t$Bu$_3$)$_2$, 80 ml of water and 210 ml of 1,2-dimethoxyethane was refluxed for 6.5 h. The main part of 1,2-dimethoxyethane was distilled off on rotary evaporator, then 400 ml of dichloromethane and 200 ml of water were added to the residue. The organic layer was separated, the aqueous layer was additionally extracted with 2×200 ml of dichloromethane. The combined organic extract was evaporated to dryness, and the residue was purified by flash-chromatography on silica gel 60 (40-63 um, 1000 g; eluent: hexanes-dichloromethane=3:1, then 2:1, vol.). The product-containing fractions were combined and then evaporated to dryness. The resulting dark-red mass was triturated with 100 ml of n-hexane, the precipitate was filtered off (G3) and dried in vacuum. This procedure gave 9.33 g (54%) of 2,2'-(4,4',5, 5'-tetramethylbiphenyl-2,2'-diyl)bis-3H-cyclopenta[a]naphthalene as a brownish powder, which contains double-bonds isomers.

Anal. calc. for C$_{42}$H$_{34}$: C, 93.64; H, 6.36. Found: C, 93.81; H, 6.60.

$^1$H NMR (CDCl$_3$): δ 7.86-7.74 (m, 1H); 7.68-7.52 (m, 2H); 7.42-7.22 (m, 4H); 7.18-7.08 (m, 1H); 6.62 (d, J=7.9 Hz) and 6.36 (d, J=8.5 Hz) {sum 1H}; 3.69-3.17 (m, 2H); 2.37 (s), 2.36 (s), 2.33 (s), 2.32 (s) and 2.31 (s) {sum 6H}.

[2,2'-Bis(η⁵-1H-cyclopenta[a]naphthalene-2-yl)-4,4', 5,5'-tetramethylbiphenyl]zirconium dichloride

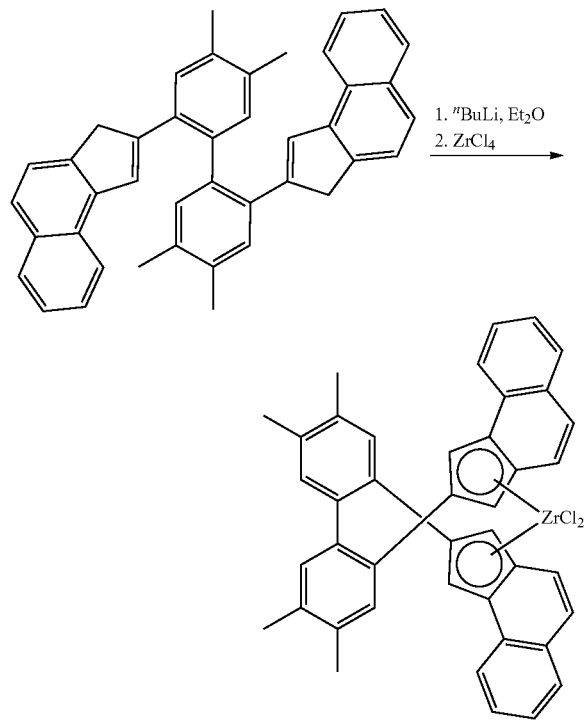

To a suspension of 4.48 g (8.32 mmol) of 2,2'-(4,4',5,5'-tetramethylbiphenyl-2,2'-diyl)bis-3H-cyclopenta[a]naphthalene in 250 ml of ether cooled to −50° C. 6.7 ml (16.75 mmol) of 2.5 M "BuLi in hexanes was added in one portion. This mixture was stirred over 20 h at room temperature. The resulting brownish-yellow solution with a brownish-yellow precipitate was cooled to −50° C. and 1.94 g (8.33 mmol) of ZrCl₄ was added. The reaction mixture was stirred for 24 h resulting in brownish solution with brownish-yellow precipitate. Further on, this mixture was evaporated to dryness, and the residue was heated with 200 ml of toluene. The obtained mixture was filtered while hot through glass frit (G4). Yellow powder precipitated overnight at room temperature was collected and then dried in vacuum. This procedure gave 2.93 g of a 9:1 mixture of C₁-symmetry ansa-zirconocene and one of two possible C₂-symmetry ansa-metallocenes (the isomeric ratio was ca. C₂$^I$/C₁/C₂$^{II}$=10/90/0). Finally, the mother liquor was evaporated to ca. 25 ml. Again, yellow powder precipitated overnight at room temperature was collected and dried in vacuum to give 0.57 g of a ca. 35:65 mixture of C₁-symmetry complex and one of two possible C₂-symmetry ansa-metallocenes, but the latter was other than that in the first crop (i.e. the isomeric ratio was ca. C₂$^I$/C₁/C2$^{II}$=0/35/65). Thus, the total yield of ansa-complexes isolated in this synthesis was 3.50 g (60%).

Anal. calc. for C₄₂H₃₂Cl₂Zr: C, 72.18; H, 4.62. Found: C, 72.27; H, 4.55.

Ansa-zirconocene of C₁-symmetry.

¹H NMR (CDCl₃): δ 8.09-8.04 (m, 1H), 7.70 (d, J=7.9 Hz, 1H), 7.66-7.11 (m, 14H), 7.08 (d, J=9.3 Hz, 1H), 6.86 (d, J=2.4 Hz, 1H), 6.0 (d, J=2.2 Hz, 1H), 5.66 (d, J=2.6 Hz, 1H), 2.49 (s, 3H), 2.47 (s, 3H), 2.44 (s, 6H).

[2,2'-Bis(η⁵-6,7,8,9-tetrahydro-1H-cyclopenta[a]naphthalene-2-yl)-4,4'-di-tert-butylbiphenyl]zirconium dichloride (VIII)

6,7,8,9-Tetrahydro-1H-cyclopenta[a]naphthalene

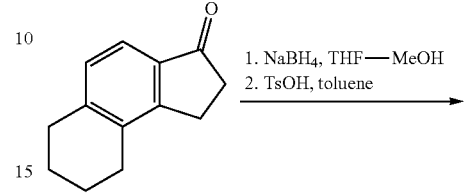

To a solution of 36.0 g (193 mmol) of 1,2,6,7,8,9-hexahydro-3H-cyclopenta[a]naphthalen-3-one in 500 ml of THF 9.15 g (0.24 mol) of NaBH₄ was added in one portion. Further on, to this mixture cooled to 0° C. 250 ml of methanol was added dropwise by vigorous stirring for 2 h. The resulting mixture was stirred overnight at room temperature and then evaporated to dryness. After that 0.5 M HCl was added to the residue, and the obtained mixture was thoroughly shaken. Then, the obtained mixture was extracted with 3×300 ml of dichloromethane. The combined organic extract was dried over Na₂SO₄ and then evaporated to dryness. The residue was dissolved in 200 ml of toluene, and the obtained solution was evaporated again. Finally, to the residue dissolved in 600 ml of toluene 0.3 g of TsOH was added. The obtained solution was refluxed with Dean-Stark trap for 10 min, cooled to room temperature, and then passed through a short pad of silica gel 60 (40-63 um). The filtrate was evaporated to dryness, and crude product was further used without additional purification.

¹H NMR (CDCl₃): δ 7.16 (d, J=7.6 Hz, 1H), 6.99 (d, J=7.6 Hz, 1H), 6.83 (dt, J=5.5 Hz, J=2.0 Hz, 1 H), 6.46 (dt, J=5.5 Hz, J=2.0 Hz, 1 H), 3.18 (t, J=2.0 Hz, 2H), 2.81 (t, J=6.0 Hz, 2H), 2.73 (t, J=6.1 Hz, 2H), 1.89-1.70 (m, 4H).

2-Bromo-2,3,6,7,8,9-hexahydro-1H-cyclopenta[a]naphthalen-3-ol

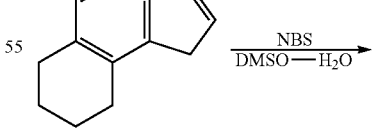

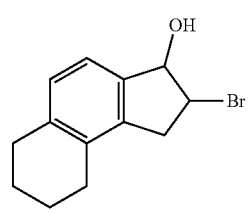

To a solution of 33.6 g (0.2 mol) of 6,7,8,9-tetrahydro-1H-cyclopenta[a]naphthalene in a mixture of 250 ml of DMSO and 7.2 ml (0.4 mol) of water 36.9 g (0.21 mol) of N-bromosuccinimide was added portionwise for 30 min. After complete addition the obtained mixture was stirred overnight at room temperature. Further on, 500 ml of water and 1000 ml of ethyl acetate were added. The organic layer was separated, and the aqueous layer was additionally extracted with 150 ml of ethyl acetate. The combined organic extract was washed with 5×500 ml of water, dried over Na$_2$SO$_4$, and evaporated to dryness. The solid residue was triturated with 200 ml of hexane, the precipitate was filtered off (G3) and then dried in vacuum. This procedure gave 31.92 g (62% from 1,2,6,7,8,9-hexahydro-3H-cyclopenta[a]naphthalen-3-one) of the title product as a white powder which was further used without additional purification.

$^1$H NMR (CDCl$_3$): δ 7.06 (d, J=7.7 Hz, 1H), 6.96 (d, J=7.7 Hz, 1H), 5.05 (d, J=5.3 Hz, 1H), 4.33-4.25 (m, 1H), 3.46 (dd, J=16.5 Hz, J=7.2 Hz, 1H), 2.94 (dd, J=16.5 Hz, J=6.5 Hz, 1H), 2.77-2.63 (m, 2H), 2.60-2.40 (m, 3H), 1.83-1.61 (m, 4H). $^{13}$C5{$^1$H} NMR (CDCl$_3$): δ 139.92, 138.12, 136.48, 132.19, 127.91, 120.98, 82.12, 56.04, 38.33, 28.98, 25.61, 22.55, 22.46.

2-Bromo-6,7,8,9-tetrahydro-1H-cyclopenta[a]naphthalene

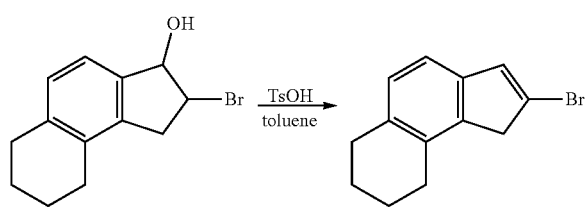

To a solution of 31.92 g (119.5 mol) of 2-bromo-2,3,6,7,8,9-hexahydro-1H-cyclopenta[a]naphthalen-3-ol in 600 ml of warm toluene 1.0 g of TsOH was added. The resulting mixture was refluxed with Dean-Stark trap for 15 min, cooled to room temperature, and then passed through a short pad of silica gel 60 (40-63 um). The filtrate was evaporated, and the residue was purified by flash chromatography on silica gel 60 (40-63 um, eluent: hexane) to give 22.63 g (70%) of the title product as a white crystalline solid.

Anal. calc. for C$_{13}$H$_{13}$Br: C, 62.67; H, 5.26. Found: C, 62.88; H, 5.53.

$^1$H NMR (CDCl$_3$): δ 7.10 (d, J=7.7 Hz, 1H), 7.02 (d, J=7.7 Hz, 1H), 6.91 (br.t, 1H), 3.43 (br.s, 2H), 2.83 (t, J=5.8 Hz, 2H), 2.70 (t, J=5.9 Hz, 2H), 1.93-1.80 (m, 4H). $^{13}$C{$^1$H} NMR (CDCl$_3$): δ 141.19, 140.99, 133.97, 132.99, 131.88, 127.66, 123.14, 117.53, 44.05, 29.50, 26.31, 23.27, 22.90.

2,2'-(4,4-Di-tert-butylbiphenyl-2,2'-diyl)bis-6,7,8,9-tetrahydro-1H-cyclopenta[a]naphthalene

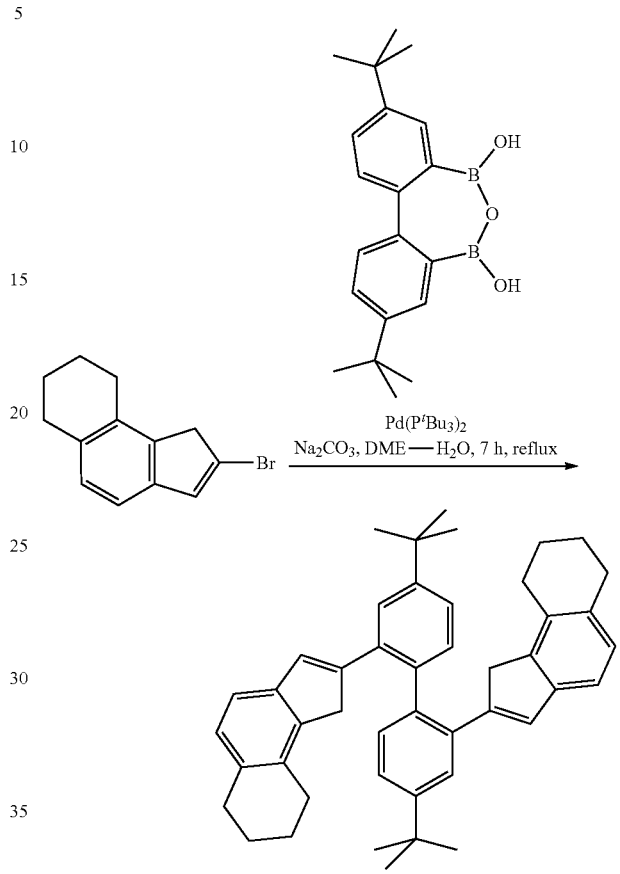

A mixture of 22.3 g (89.51 mmol) of 2-bromo-6,7,8,9-tetrahydro-1H-cyclopenta[a]-naphthalene, 13.71 g (40.8 mmol) of 3,9-di-tert-butyldibenzo[c,e][1,2,7]oxadiborepine-5,7-diol, 18.7 g (176 mmol) of Na$_2$CO$_3$, 1.4 g (2.74 mmol) of Pd(P$^t$Bu$_3$)$_2$, 100 ml of water and 260 ml of 1,2-dimethoxyethane was refluxed for 7 h. Solid precipitated from the reaction mixture overnight at room temperature was filtered off (G3) and then dissolved in a mixture of 400 ml of dichloromethane and 200 ml of water. The organic layer was separated, the aqueous layer was additionally extracted with 100 ml of dichloromethane. The combined organic extract was evaporated to dryness, and the red residue was purified by flash-chromatography on silica gel 60 (40-63 um, 1000 g; eluent: hexanes-dichloromethane=5:1, vol.). The product-containing fractions were combined and evaporated to ca. 50 ml. The formed precipitate was filtered off (G3) and dried in vacuum. This procedure gave 17.26 g (70%) of 2,2'-(4,4'-di-tert-butylbiphenyl-2,2'-diyl)bis-6,7,8,9-tetrahydro-1H-cyclopenta[a]-naphthalene as a white powder which contains single double-bonds isomer.

Anal. calc. for C$_{46}$H$_{50}$: C, 91.64; H, 8.36. Found: C, 91.99; H, 8.60.

$^1$H NMR (CDCl$_3$): δ 7.47 (d, J=2.0 Hz, 1H), 7.31 (dd, J=7.9 Hz, J=2.0 Hz, 1H), 7.24 (d, J=7.9 Hz, 1H), 6.92 (d, J=8.2 Hz, 1H), 6.90 (d, J=8.2 Hz, 1H), 6.29 (s, 1H), 3.04 (d, J=22.5 Hz, 1H), 2.97 (d, J=22.5 Hz, 1H), 2.79-2.72 (m, 2H), 2.55-2.36 (m, 2H), 1.82-1.71 (m, 4H), 1.38 (s, 9H). $^{13}$C{$^1$H} NMR (CDCl$_3$,): δ 150.22, 146.17, 142.33, 142.25, 137.89, 136.16, 133.23, 131.79, 130.69, 130.15, 127.28, 125.29, 124.04, 118.09, 39.28, 34.58, 31.44, 29.59, 26.22, 23.45, 23.02.

[2,2'-Bis($\eta^5$-6,7,8,9-tetrahydro-1H-cyclopenta[a]naphthalene-2-yl)-4,4'-di-tert-butylbiphenyl]zirconium dichloride

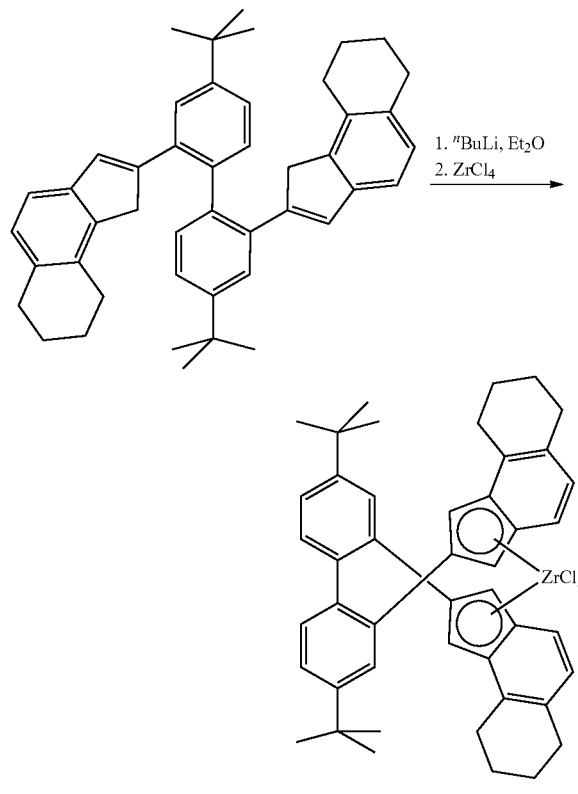

To a suspension of 12.77 g (21.18 mmol) of 2,2'-(4,4'-di-tert-butylbiphenyl-2,2'-diyl)bis-6,7,8,9-tetrahydro-1H-cyclopenta[a]naphthalene in 400 ml of ether cooled to −50° C. 17.0 ml (42.5 mmol) of 2.5 M $^n$BuLi in hexanes was added in one portion. This mixture was stirred over 5 h at room temperature. The resulting yellowish solution with voluminous precipitate was cooled to −50° C., and 4.94 g (21.2 mmol) of ZrCl$_4$ was added. The reaction mixture was stirred for 24 h at ambient temperature resulting in yellowish solution with voluminous yellow precipitate. The resulting mixture was evaporated to dryness, and the residue was heated with 400 ml of toluene. The obtained mixture was filtered while hot through glass frit (G4), and the filtrate was evaporated to ca. 250 ml. Yellow powder precipitated overnight at room temperature from this solution was collected and then dried in vacuum. This procedure gave 2.47 g of a 75:25 mixture of $C_1$-symmetry ansa-zirconocene and one of two possible $C_2$-symmetry complexes ($C_2^I/C_1/C_2^{II}$=0/75/25). The mother liquor was evaporated to ca. 80 ml. Again, yellow powder precipitated overnight at room temperature was collected and dried in vacuum to give 2.82 g of a ca. 73:25:2 mixture of ansa-metallocene of 73% of $C_1$-symmety form and two possible $C_2$-symmetry complexes, respectively, but this crop contained predominantly $C_2$-symmetric isomer other than that in the first crop (so, the ratio of isomers $C_2^I/C_1/C_2^{II}$ was ca. 25/73/2). Then, other three crops were obtained by sequential crystallization of the prodict in mother liquor in a similar manner: 1.85 g (from 65 ml of toluene, ratio of isomers was ca. $C_2^I/C_1/C_2^{II}$=92/4/4), 5.30 g (from 45 ml of toluene, ratio of isomers $C_2^I/C_1/C_2^{II}$ was ca. 41/56/3) and 2.40 g (from 25 ml of toluene, ratio of isomers $C_2^I/C_1/C_2^{II}$ was ca. 74/22/4). Thus, the total yield of ansa-complexes isolated in this synthesis was 14.84 g (92%).

Anal. calc. for $C_{46}H_{48}Cl_2Zr$: C, 72.41; H, 6.34. Found: C, 72.65; H, 6.56.

Ansa-zirconocene $C^1$ of $C_2$-symmetry.

$^1$H NMR (CDCl$_3$): δ 7.73 (d, J=2.0 Hz, 1H), 7.54 (dd, J=7.9 Hz, J=2.0 Hz, 1H), 7.31 (d, J=7.9 Hz, 1H), 6.99 (d, J=8.7 Hz, 1H), 6.89 (d, J=8.7 Hz, 1H), 6.78 (d, J=2.5 Hz, 1H), 5.58 (d, J=2.5 Hz, 1H), 3.14-3.00 (m, 1H), 2.87-2.58 (m, 3H), 1.88-1.63 (m, 4H), 1.46 (s, 9H). $^{13}$C{$^1$H} NMR (CDCl$_3$,): δ 151.67, 135.91, 134.41, 132.65, 132.50, 131.16, 130.58, 130.31, 128.57, 128.52, 126.59, 125.01, 121.76, 102.36, 101.20, 34.82, 31.41, 29.59, 26.42, 22.81, 22.25.

Rac-diethylsilylene-bis($\eta^5$-cyclopenta[a]naphthalen-2-yl)dimethylzirconiurn (XI) Bis(1/3H-cyclopenta[a]naphthalen-2-yl)diethylsilane

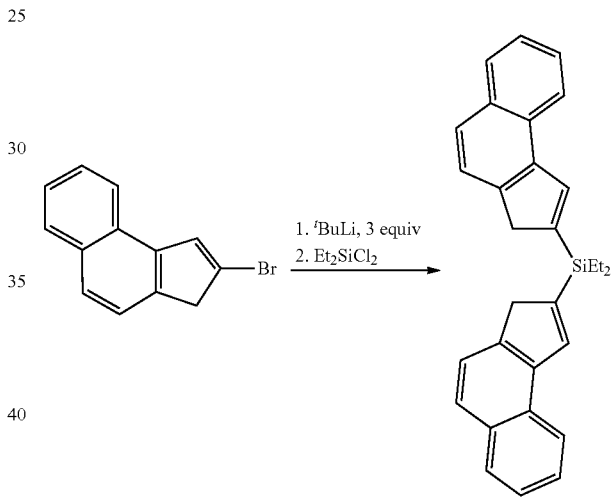

To a solution of 4.0 g (16.3 mmol) of 2-bromo-3H-cyclopenta[a]naphthalene in 120 ml of ether 30.6 ml (48.9 mmol) of 1.6 M $^t$BuLi in pentane was added at −80° C. The obtained mixture was warmed to room temperature and then stirred for 2 h at ambient temperature. Further on, this mixture was cooled to −80° C., and 1.2 ml (8.2 mmol) of dichloro(diethyl)silane was added in one portion. The stirred mixture was left in the cooling bath to warm slowly for 10 h, and then aqueous NH$_4$Cl was added. The organic phase was separated, washed with cold water, then dried over Na$_2$SO$_4$, and finally evaporated to dryness. The product was isolated by flash chromatography on silica gel 60 (40-63 um; eluent: hexane-dichloromethane=10:1, vol.). This procedure gave 3.20 g (90%) of the title compound as a colorless oil (a mixture of two isomers in ratio ca. 6:7).

Anal. calc. for $C_{30}H_{28}Si$: C, 86.48; H, 6.77. Found: C, 86.69; H, 6.90.

$^1$H NMR (CDCl$_3$): δ 8.21 (d, J=8.1 Hz), 7.99 (d, J=8.3 Hz), 7.87-7.93 (m), 7.78 (d, J=8.3 Hz), 7.65-7.73 (m), 7.61 (d, J=8.3 Hz), 7.39-7.55 (m), 3.87 (s), 3.72 (s), 1.06-1.20 (m).

Rac-diethylsilylene-bis($\eta^5$-cyclopenta[a]naphthalen-2-yl)dimethylzirconium

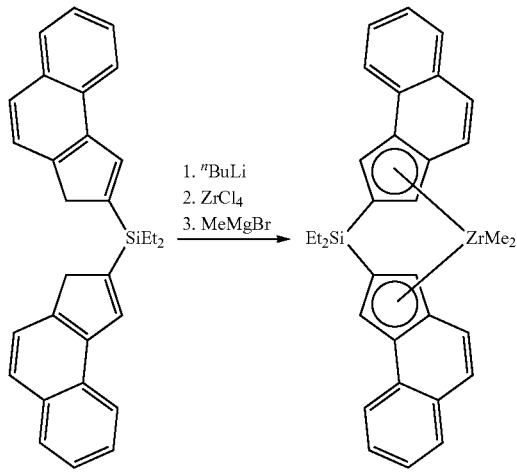

To a solution of 3.05 g (7.32 mmol) of bis(1/3H-cyclopenta[a]naphthalen-2-yl)diethylsilane in 100 ml of ether cooled to 0° C. 5.85 ml (14.64 mmol) of 2.5 M $^n$BuLi in hexanes was added in one portion. This mixture was stirred overnight at room temperature. The resulting mixture was cooled to −80° C., and 1.70 g (7.32 mmol) of ZrCl$_4$ was added. The reaction mixture was stirred for 24 h giving a yellow solution with heavy yellow precipitate. The precipitate was filtered off (G3), washed with ether, and then dried in vacuum. This procedure gave 3.21 g of a mixture of rac- and meso-zirconocene dichlorides as well as LiCl. This crude product was suspended in 150 ml of toluene, and then 20 ml (50.0 mmol) of 2.5 M MeMgBr in ether was added at room temperature. The obtained heterogeneous mixture was heated for 12 h at 90° C. and then filtered while hot through glass frit (G3) to remove insoluble magnesium salts. The filter cake was additionally washed with 20 ml of warm toluene. The combined filtrate was evaporated to dryness. The obtained residue was washed with hexane and then dried in vacuum. This procedure gave 2.00 g of a ca. 2 to 3 mixture of the methylated rac- and meso-complexes. The following crystallisation of this mixture from toluene-ether (1:1, vol.) gave 0.41 g (53%) of analytically pure rac-isomer.

Anal. calc. for C$_{30}$H$_{26}$C$_{12}$SiZr: C, 62.48; H, 4.54. Found: C, 62.76; H, 4.70.

$^1$H NMR (C$_6$D$_6$): δ 7.98 (d, J=8.0 Hz, 2H), 7.48 (d, J=8.0 Hz, 2H), 7.36 (m, 2H), 7.31 (d, J=9.1 Hz, 2H), 7.17-7.23 (m, 4H), 6.46 (d, J=2.0 Hz, 2H), 5.95 (d, J=2.0 Hz, 2H), 1.16-1.23 (m, 6H), 0.98-1.06 (m, 4H), 1.12 (s, 6H).

Preparation of the Silica Supported Metallocene Catalyst and Its Characterization The immobilization of the single site catalyst, on silica was performed using Incipient Wetness technique and it involves the following steps:
1. MAO (7.6 mL, 30 w %) is added to 0.244 mmol of single site catalyst and the solution is stirred at room temperature for 30 min
2. The MAO/single site catalyst solution is added drop wise to 5.0 g of silica (ES70X, activated at 600° C. for 4 h) while the mixture is stirred mechanically (incipient wetness)
3. The mixture is stirred at 50° C. for 1 h. Volatiles are evaporated in vacuo at 75° C. for 1 h The elemental compositions of the supported catalysts were measured with XRF.

Comparative Experiments:

In order to compare the catalyst performance, state of the art catalysts, Biph (2-Ind)$_2$ZrCl$_2$ was also immobilized on silica using the same protocol mentioned above. Reference patent for state of the art catalyst: U.S. Pat. No. 6342622 B1.

XRF Results of the Catalysts

| Cat ID | Cat | Al wt % | Si wt % | Zr wt % |
|---|---|---|---|---|
| III-Supported | Biph-(2-BenzInd)$_2$ZrCl$_2$ | 14.8 | 28.6 | 0.29 |
| A | Biph-(2-Ind)$_2$ZrCl$_2$ | 13.5 | 29.8 | 0.30 |
| B | Biph-(2-IndMe$_2$)$_2$ZrCl$_2$ | 13.5 | 30.7 | 0.27 |
| C | (nBuMeCp)$_2$ZrCl$_2$ | 14.2 | 29.6 | 0.29 |
| D | (nBuCp)$_2$ZrCl$_2$ | 15.0 | 28.9 | 0.35 |

A - D: State of the art catalysts supported on silica/comparative examples

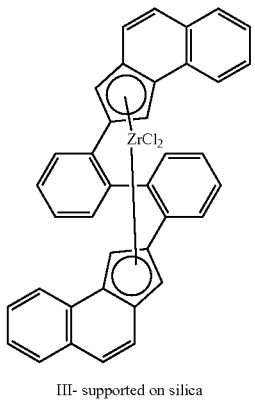

III- supported on silica

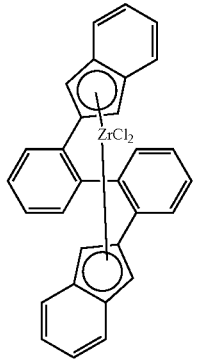

A

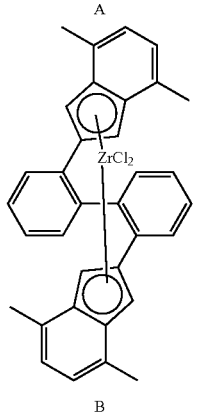

B

-continued

| Cat ID | Cat | Al wt % | Si wt % | Zr wt % |
|---|---|---|---|---|

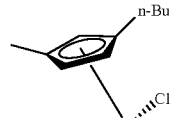

C

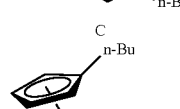

D

Ethylene/1-hexene Copolymerization in Solution (PPR)

PPR Polymerization Protocols

Prior to the execution of a library, the 48 PPR cells (reactors) undergo bake-and-purge' cycles overnight (8 h at 90-140° C. with intermittent dry $N_2$ flow), to remove any contaminants and left-overs from previous experiments. After cooling to glove-box temperature, the stir tops are taken off, and the cells are fitted with disposable 10 mL glass inserts and PEEK stirring paddles (previously hot-dried under vacuum); the stir tops are then set back in place, the cells are loaded with the proper amounts of toluene (in the range 2.0-3.5 mL), 1-hexene (in the range 0.5 -2.0 mL) and MAO solution (100 µL of 0.1 mol $L^{-1}$ in toluene), thermostated at 80° C., and brought to the operating pressure of 65 psig with ethylene. At this point, the catalyst injection sequence is started; proper volumes of a toluene 'chaser', a solution of the precatalyst in toluene (typically in the range 0.01-0.05 mmol $L^{-1}$), and a toluene 'buffer' are uptaken into the slurry needle, and then injected into the cell of destination. The reaction is left to proceed under stirring (800 rpm) at constant temperature and pressure with continuous feed of ethylene for 30 min, and quenched by over-pressurizing the cell with dry air (preferred to other possible catalyst poisons because in case of cell or quench line leaks oxygen is promptly detected by the dedicated glove-box sensor).

After quenching, the cells are cooled down and vented, the stir-tops are removed, and the glass inserts containing the reaction phase are taken out and transferred to a Genevac EZ2-Plus centrifugal evaporator, where all volatiles are distilled out and the polymers are thoroughly dried overnight. Reaction yields are double-checked against on-line monomer conversion measurements by robotically weighing the dry polymers in a Bohdan Balance Automator while still in the reaction vials (subtracting the pre-recorded tare). Polymer aliquots are then sampled out for the characterizations.

GPC Analysis

GPC curves are recorded with a Freeslate Rapid GPC setup, equipped with a set of 2 mixed-bed Agilent PLgel 10 µm columns and a Polymer Char $1R_4$ detector. The upper deck of the setup features a sample dissolution station for up to 48 samples in 10 mL magnetically stirred glass vials, 4 thermostated bays each accommodating 48 polymer solutions in 10 mL glass vials, and a dual arm robot with two heated injection needles. With robotic operation, pre-weighed polymer amounts (typically 1-4 mg) are dissolved in proper volumes of orthodichlorobenzene (ODCB) containing 0.40 mg $mL^{-1}$ of 4-methyl-2,6-di-tert-butylphenol (BHT) as a stabilizer, so as to obtain solutions at a concentration of 0.5 to 1.0 mg $mL^{-1}$. After 2 h at 150° C. under gentle stirring to ensure complete dissolution, the samples are transferred to a thermostated bay at 145° C., and sequentially injected into the system at 145° C. and a flow rate of 1.0 mL min⁻. In post-trigger delay operation mode, the analysis time is 12.5 min per sample. Calibration is carried out with the universal method, using 10 monodisperse polystyrene samples (Mn between 1.3 and 3700 KDa). Before and after each campaign, samples from a known i-PP batch produced with an ansa-zirconocene catalyst are analyzed for a consistency check.

NMR Characterizations $^{13}C$ NMR spectra are recorded with a Bruker Avance 400 III spectrometer equipped with a 5 mm High Temperature Cryoprobe, and a robotic sample changer with pre-heated carousel (24 positions). The samples (20-30 mg) are dissolved at 120° C. in tetrachloroethane-1,2-$d_2$ (0.6 mL), added with 0.40 mg $mL^{-1}$ of BHT as a stabilizer, and loaded in the carousel maintained at the same temperature. The spectra are taken sequentially with automated tuning, matching and shimming. Typical operating conditions for routine measurements are: 45° pulse; acquisition time, 2.7 s; relaxation delay, 5.0 s; 400-800 transients (corresponding to an analysis time of 30-60 min). Broad-band proton decoupling is achieved with a modified WALTZ16 sequence (BI-_WALTZ16_32 by Bruker).

TABLE

Ethylene copolymerization results with unsupported catalyst in PPR

| Cat ID | Catalyst | 1-C6 (%, v/v) | *Rp | $M_w$ (kg/mol) | PDI | C6 incorporation (mol %) |
|---|---|---|---|---|---|---|
| III | Biph (2-BenzInd)ZrCl$_2$ | 10 | 1327 | 355 | 3 | 3.3 |
| III | Biph (2-BenzInd)ZrCl$_2$ | 40 | 339 | 175 | 2.5 | 12.5 |
| IV | Biph (2-BenzInd)HfCl$_2$ | 10 | 121 | 274 | 2.1 | 5.2 |
| VI | $^{tBu}$Biph (2-BenzInd)ZrCl$_2$ | 10 | 1777 | 227 | 2.6 | 6.3 |
| VI | $^{tBu}$Biph (2-BenzInd)ZrCl$_2$ | 40 | 640 | 166 | 2.0 | 23.3 |
| VII | $^{Me}{}_2$Biph (2-BenzInd)ZrCl$_2$ | 10 | 510 | 244 | 2.1 | 4.7 |
| VII | $^{Me}{}_2$Biph (2-BenzInd)ZrCl$_2$ | 40 | 88 | 155 | 2.2 | 18 |

TABLE-continued

Ethylene copolymerization results with unsupported catalyst in PPR

| Cat ID | Catalyst | 1-C6 (%, v/v) | *Rp | $M_w$ (kg/mol) | PDI | C6 incorporation (mol %) |
|---|---|---|---|---|---|---|
| VIII | $^{tBu}$Biph(2-THInd)ZrCl$_2$ | 10 | 646 | 302 | 2.6 | 1.4 |
| XI | Me$_2$Si(2-BenzInd)ZrMe$_2$ | 10 | 80 | 7 | 2.3 | 10.6 |
| XI | Me$_2$Si(2-BenzInd)ZrMe$_2$ | 40 | 422 | 7 | 2.3 | 30.5 |
| A | Biph(2-Ind)$_2$ZrCl$_2$ | 10 | 478 | 386 | 2.9 | 1 |
| A | Biph(2-Ind)$_2$ZrCl$_2$ | 40 | 160 | 222 | 3.0 | 4.1 |
| B | Biph(2-IndMe$_2$)$_2$ZrCl$_2$ | 10 | 601 | 401 | 2.8 | 2 |
| B | Biph(2-IndMe$_2$)$_2$ZrCl$_2$ | 40 | 136 | 92 | 2.2 | 12.7 |
| D | (n-BuCp)$_2$ZrCl$_2$ | 10 | 498 | 159 | 2.5 | 1.8 |
| D | (n-BuCp)$_2$ZrCl$_2$ | 40 | 180 | 49 | 3.1 | 6.0 |

*Rp = Productivity in kg mmol$_{cat}^{-1}$ [C$_2$H$_4$]$^{-1}$ h$^-$, Poymerisation time = 30 min, temperature = 80° C., MAO = 2 mM.
IV = New catalyst; A-D: State of the art catalysts.

Ethylene/1-hexene Copolymerization in Bench Scale Slurry Reactor

Ethylene Homopolymerization Procedure in Slurry

The polymerizations were carried out in a 5 L bench scale batch reactor. The reactor operates under slurry conditions using isobutane as diluent. The 5 liter reactor is filled to 65% of its volume with diluent prior to each experiment. Atmer 163 premixed with 2 equivalents of TiBA was used as anti-fouling agent and TiBA was used as scavenger (0.017 mmol/L). The temperature of the reactor was kept as constant as possible by a thermostat bath. About 100 mg of the immobilised catalysts was then injected into the reactor, and constant ethylene pressure was maintained. After 1 hour of reaction time, the polymers were collected and dried in the vacuum oven (60° C., overnight) before the further analysis.

Ethylene/1-hexene Copolymerization

Copolymerizations were also carried out in the same experimental set up used for homopolymerization. The same polymerization protocols were used except that specific amount of 1-hexene was fed into the reactor prior to the ethylene feed. After 1 hour of reaction time, the polymers were collected and dried in the vacuum oven (60° C., overnight) before the further analysis.

Ethylene homo and copolymerization results are given in Table 2.

TABLE 2

Homo and copolymerization results of supported catalysts*

| Cat ID | 1-hexene (mL) | Activity (gPE/gcat) | MFI 21.6 | Density Kg/m$^3$ | Branches/1000C | Mw (kg/mol) | Mn (kg/mol) | Mw/Mn |
|---|---|---|---|---|---|---|---|---|
| III-Supported | 0 | 5025 | 0.3 | 943 | — | 285 | 77 | 3.7 |
| III-Supported | 75 | 4253 | 0.2 | 917 | 8.2 | 295 | 82 | 3.6 |
| III-Supported | 150 | 1618 | 3.3 | 913 | 10 | — | — | — |
| A | 0 | 7016 | 4.6 | 949 | — | 195 | 67 | 2.9 |
| A | 75 | 9707 | 6.6 | 935 | 2.4 | 155 | 57 | 2.7 |
| A | 150 | 9773 | 6.0 | 932 | 2.8 | 170 | 60 | 2.8 |
| B | 0 | 1311 | 2.2 | 950 | | 240 | 65 | 3.8 |
| B | 75 | 2178 | 2.8 | 934 | 2.0 | 220 | 67 | 3.3 |
| C | 0 | 762 | 1 | 946 | — | 270 | 96 | 2.8 |
| C | 75 | 2066 | 5 | 925 | 4.8 | 170 | 70 | 2.4 |
| D | 0 | 4517 | 15.7 | 950 | — | 130 | 46 | 2.8 |
| D | 75 | 8387 | 38 | 926 | 6.8 | 95 | 35 | 2.7 |

$^a$ Polymerization Temperature = 80° C.

*Polymerization Temperature = 87° C., Polymerization time = 1 hour, isobutane as diluent.

The invention claimed is:

1. A metallocene complex according to formula I or II

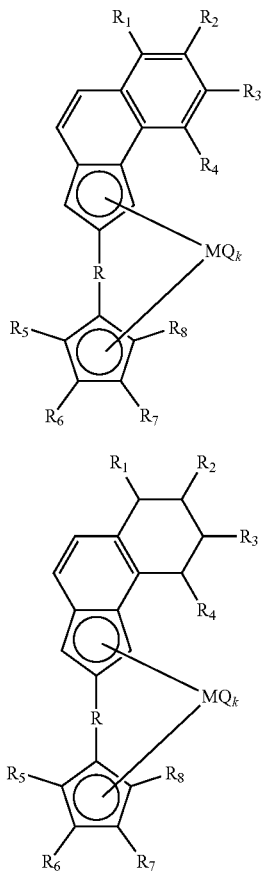

Formula I

Formula II wherein
M is a metal selected from lanthanides or transition metals from group 3, 4, 5 or 6 of the Periodic System of the Elements,
Q is an anionic ligand to M,
k is the number of Q groups and equals the valence of M minus 2,
R is a divalent bridging group, selected from a phenylene or biphenylene, which is unsubstituted or substituted with alkyl groups having 1 to 10 carbon atoms,
$R_1$, $R_2$, $R_3$ and $R_4$ are each independently chosen from the group consisting of hydrogen (H); a halogen atom; a silyl, alkyl, cycloalkyl, aryl, alkylaryl or arylalkyl group; and
$R_5$, $R_6$, $R_7$ and $R_8$ are each independently chosen from the group consisting of hydrogen (H); a halogen atom; a silyl, alkyl, cycloalkyl, aryl, alkylaryl or arylalkyl group; or two adjacent radicals $R_5$ and $R_6$, $R_6$ and $R_7$, and/or $R_7$ and $R_8$ are connected with each other in a hydrocarbon ring system.

2. The metallocene complex according to claim 1, wherein $R_6$ and $R_7$ are connected and form together a ring system, such that a cyclopenta[a]naphthalene ligand or tetrahydrocyclopenta[a]naphthalene ligand is formed.

3. The metallocene complex according to claim 1, wherein M is chosen from Ti, Zr and Hf.

4. The metallocene complex according to claim 1, wherein Q is chosen from the group consisting of Cl or a methyl group.

5. The metallocene complex according to claim 1, wherein the metallocene complex comprises two cyclopenta[a]naphthalene ligands or tetrahydrocyclopenta[a]naphthalene ligands and the bridging group R is connected to the 2-position of both ligands.

6. The metallocene complex according to claim 1, wherein R is chosen from a group consisting of a 2,2'-biphenylene group or a substituted 2,2'-biphenylene group.

7. The metallocene complex according to claim 1, Formula I or II

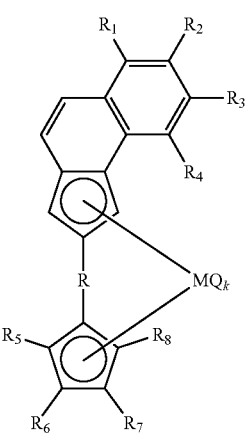

Formula I

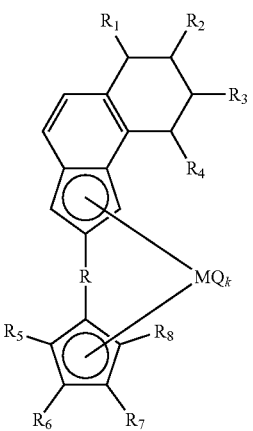

Formula II wherein
M is a metal selected from lanthanides or transition metals from group 3, 4, 5 or 6 of the Periodic System of the Elements,
Q is an anionic ligand to M,
k is the number of Q groups and equals the valence of M minus 2,
R is Y(Z)n, wherein Y is the bridging atom and is chosen from carbon, phosphorus, sulfur, silicon or germanium, Z is C1-C8 alkyl, C3-C10 cycloalkyl or C6-C10 aryl and n is 0, 1 or 2,
$R_1$, $R_2$, $R_3$ and $R_4$ are each independently chosen from the group consisting of hydrogen (H); a halogen atom; a silyl, alkyl, cycloalkyl, aryl, alkylaryl or arylalkyl group; and
$R_5$, $R_6$, $R_7$, and $R_8$ are each independently chosen from the group consisting of hydrogen (H); a halogen atom; a silyl, alkyl, cycloalkyl, aryl, alkylaryl or arylalkyl group; or two adjacent radicals $R_5$ and $R_6$, $R_6$ and $R_7$, and/or $R_7$ and $R_8$ are connected with each other in a hydrocarbon ring system.

8. The metallocene complex according to claim 7, wherein R is a —SiMe₂ or SiEt₂ bridge.
9. The metallocene complex according to claim 1, wherein the metallocene is selected from the group consisting of complexes according to formulas III-XIII:
III
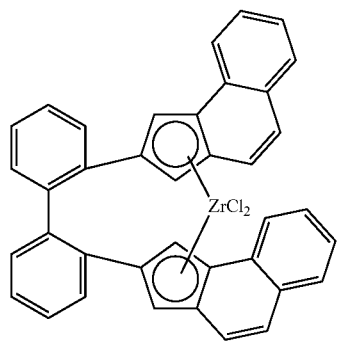
IV
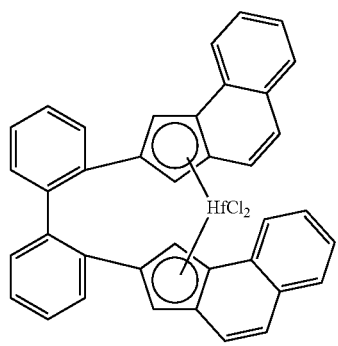
V
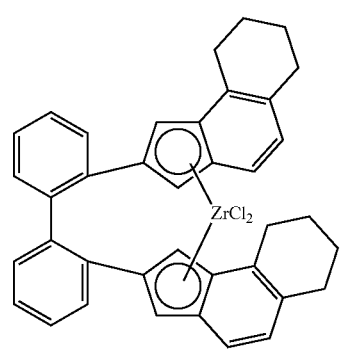
VI
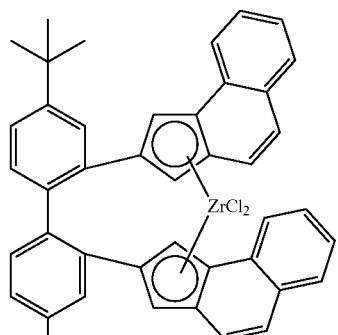
-continued
VII
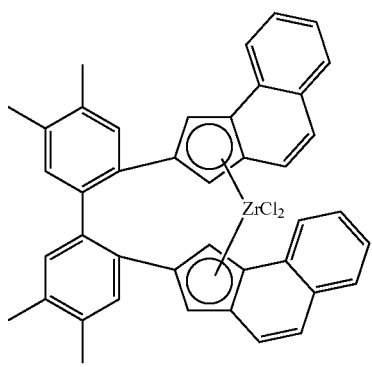
VIII
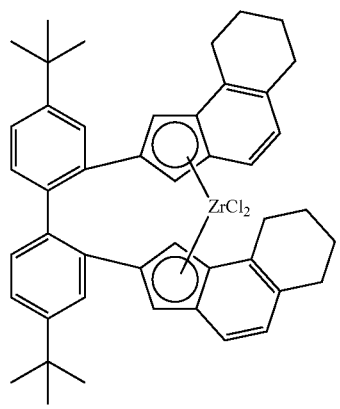
IX
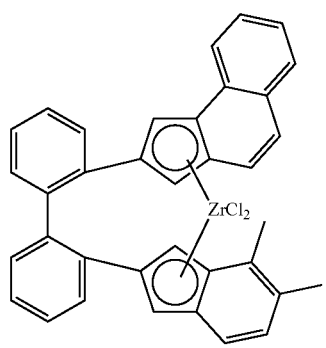
X
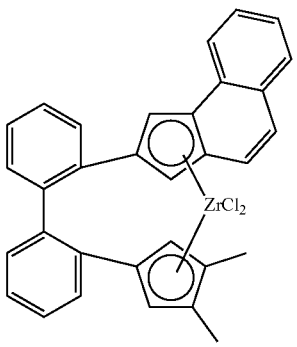

XI

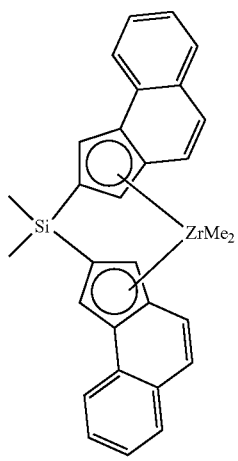

XII

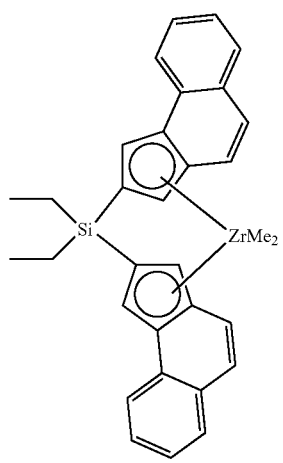

XIII

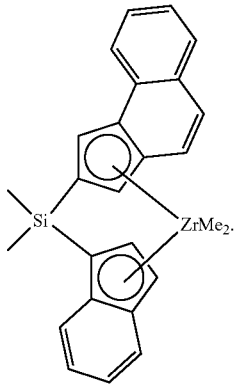

10. A catalyst for polymerizing olefins into polyolefins, wherein the catalyst is formed by reacting a metallocene complex according to claim 1 and a cocatalyst, wherein the cocatalyst is an aluminum or boron containing cocatalyst.

11. The catalyst according to claim 10, wherein the catalyst comprises an inorganic support.

12. A process for polymerizing olefins, which comprises the steps of providing a polymerization reactor, providing at least one monomer, a metallocene complex according to claim 1 and a cocatalyst, and giving sufficient time to prepare a polyolefin under polymerization conditions.

13. The process according to claim 12, wherein at least ethylene and an alpha-olefin are present as monomers to prepare a polyethylene.

14. A catalyst for polymerizing at least ethylene and an alpha-olefin to prepare a polyethylene, wherein the catalyst is formed by reacting a metallocene complex according to claim 9 and a cocatalyst, wherein the catalyst comprises an inorganic support and wherein the cocatalyst is an aluminoxane, an aluminum alkyl compound, a perfluorophenylborane or a perfluorophenylborate.

15. A process for polymerizing at least ethylene and an alpha-olefin to prepare a polyethylene, which comprises the steps of providing a polymerization reactor, providing at least one monomer, a metallocene complex as defined in claim 14 and the cocatalyst, and giving sufficient time to prepare the polyethylene under polymerization conditions.

\* \* \* \* \*